US007751102B2

(12) United States Patent
Fujiwara et al.

(10) Patent No.: US 7,751,102 B2
(45) Date of Patent: Jul. 6, 2010

(54) IMAGE FORMING APPARATUS AND METHOD CAPABLE OF LIGHTNESS ADJUSTMENT OF IMAGE OUTPUT WITH COLOR BALANCE THEREOF PRESERVED

(75) Inventors: Shingo Fujiwara, Nagoya (JP); Tetsuya Kato, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 885 days.

(21) Appl. No.: 11/111,916

(22) Filed: Apr. 22, 2005

(65) Prior Publication Data
US 2005/0243352 A1 Nov. 3, 2005

(30) Foreign Application Priority Data
Apr. 28, 2004 (JP) ............................. 2004-132665

(51) Int. Cl.
*G03F 3/08* (2006.01)
(52) U.S. Cl. .................. 358/518; 358/1.9; 358/519; 358/520; 358/529; 382/167
(58) Field of Classification Search ............... 358/1.9, 358/2.1, 3.02, 518–520, 522, 529, 448, 461; 382/162–167, 274; 345/589–591; 399/45, 399/51, 52
See application file for complete search history.

(56) References Cited
U.S. PATENT DOCUMENTS

| | | | | |
|---|---|---|---|---|
| 5,079,723 A | * | 1/1992 | Herceg et al. | 715/810 |
| 5,121,195 A | * | 6/1992 | Seki et al. | 358/515 |
| 5,196,937 A | * | 3/1993 | Kageyama | 348/678 |
| 5,426,582 A | * | 6/1995 | Bossaert et al. | 358/522 |
| 6,100,994 A | * | 8/2000 | Schliekelmann et al. | 358/1.15 |
| 6,480,202 B1 | * | 11/2002 | Deguchi et al. | 358/518 |
| 6,753,987 B1 | * | 6/2004 | Farnung et al. | 358/518 |
| 6,831,755 B1 | * | 12/2004 | Narushima et al. | 358/1.9 |
| 7,061,648 B2 | * | 6/2006 | Nakajima et al. | 358/1.9 |
| 2003/0053095 A1 | * | 3/2003 | Nakami | 358/1.9 |
| 2003/0174228 A1 | * | 9/2003 | Brake et al. | 348/333.11 |
| 2005/0206927 A1 | * | 9/2005 | Yamada | 358/1.9 |

FOREIGN PATENT DOCUMENTS

| | | |
|---|---|---|
| EP | 1292121 A1 * | 3/2003 |
| JP | A 10-79888 | 3/1998 |
| JP | A 2003-46779 | 2/2003 |

* cited by examiner

*Primary Examiner*—Mark K Zimmerman
*Assistant Examiner*—Javier J Ramos
(74) *Attorney, Agent, or Firm*—Oliff & Berridge, PLC

(57) ABSTRACT

An apparatus for forming an image is disclosed which includes: an input device inputting image data; an image processor processing the inputted image data; an image forming device forming the image on a recording medium, based on the processed image data; a lightness setting device setting a lightness value of the image to be formed on the recording medium by the image forming device; a first corrector correcting the inputted image data according to a first correction characteristic; a first characteristic modifier modifying the first correction characteristic, in response to setting of increasing the lightness value by the lightness setting device; a second corrector correcting the processed image data according to a second correction characteristic; and a second characteristic modifier modifying the second correction characteristic, in response to setting of decreasing the lightness value by the lightness setting device.

33 Claims, 19 Drawing Sheets

IMAGE FORMING APPARATUS AND METHOD CAPABLE OF LIGHTNESS ADJUSTMENT OF IMAGE OUTPUT WITH COLOR BALANCE THEREOF PRESERVED

This application is based on Japanese Patent Application No. 2004-132665 filed Apr. 28, 2004, the content of which is incorporated hereinto by reference.

CROSS-REFERENCE TO RELATED APPLICATIONS

Not Applicable.

BACKGROUND OF THE INVENTION

1. Field of the Invention

The invention relates to techniques of forming an image on a recording medium (e.g., a recording paper) with its lightness be adjustable, and more particularly to techniques of converting image data (e.g., data indicative of an image scanned or captured by a color scanner) of additive primary colors (e.g., three primary colors) into recording data of subtractive primary colors (e.g., a combination of three primary colors and a black color), and forming an image on the recording medium using the recording data.

2. Description of the Related Art

Color copiers, and facsimile machines and digital multifunction apparatuses each having a copying function are known. Typically, such a type of an apparatus is constructed to include: a color scanner (an image reader or an image capture device); an image processor; and a color printer (an imager or an image recorder).

The color scanner is adapted to capture the image of an original document, by separating the image into color components of R (red), G (green), and B (blue), which are additive three primary colors, and by producing image data indicative of the color components. The image data will be also referred to as "captured-image data."

The image processor is adapted to produce image data indicative of color components of C (cyan), M (magenta), and Y (yellow), which are subtractive three primary colors, and K (black), from the image data (captured-image data) produced by the color scanner. The image data produced by the image processor will be also referred to as "recording data."

The color printer is adapted to form an image on the recording medium, using four different colored colorants of C, M, Y, and K colors, based on the recording data of C, M, Y, and K color components produced by the image processor.

Such a type of an image forming apparatus including the above-described color scanner, image processor, and color printer is operated such that an original document is captured by the color scanner to produce captured-image data (image data indicative of R, G, and B color components), the captured-image data is converted into the recording data indicative of C, M, Y, and K color components, and then, the color printer outputs a copy image of the original document, using the recording data of these four color components.

Color copiers and multi-function apparatuses incorporating a copying function are typically provided with as one of standard keys a lightness-adjustment key for allowing the user to request or instruct the lightness of an image formed on a recording paper (hereinafter, referred to as "copy image output") to be adjusted.

The lightness-adjustment key is constructed as a member manipulated by the user for changing a set value of the lightness value of a copy image output, relative to a standard lightness value (e.g., a default value for the lightness), at given intervals, in multiple steps, in a selected one of a plus direction to brighten the copy image output, and a minus direction to darken the copy image output. The user is allowed to adjust in lightness a copy image output as a whole, to achieve a desired lightness, either for brightening or for darkening, depending on the user's manipulation via the lightness-adjustment key.

More specifically, the aforementioned image processor is constructed to include, as illustrated in FIG. 10, a first gamma corrector 101; a color converter 102, a UCR (Under Color Removal) processor 103; and a second gamma corrector 104.

The first gamma corrector 101 is for use in gamma-correcting the image data of R, G, and B color components delivered from the color scanner. The color converter 102 is for use in producing from the image data of R, G, and B color components gamma-corrected by the first gamma corrector 101, image data of C, M, and Y color components, through color conversion. The UCR processor 103 is for use in producing from the produced image data of C, M, and Y color components, image data of a K color component. The second gamma corrector 104 is for use in gamma-correcting the image data of C, M, Y, and K color components delivered from the UCR processor 103.

In the thus-constructed image processor, a gamma characteristic used in the first gamma corrector 101 is made variable depending on the set value of lightness established to the user's operation via the lightness-adjustment key, as illustrated in graph in FIG. 11, and the captured-image data is gamma-corrected according to the gamma characteristic conforming with the set value of lightness established to the user's operation via the lightness-adjustment key, resulting in adjustment in lightness of a copy image output.

More specifically, as illustrated in FIG. 11, in the above image processor, there are stored data of a gamma characteristic curve for achieving the standard lightness value, which forms the basis of the following curves; data of a gamma characteristic curve for achieving the lightness adjustment in the minus (darkening) direction; and data of a gamma characteristic curve for achieving the lightness adjustment in the plus (brightening) direction.

In the image processor, an available gamma characteristic curve is sequentially modified by selecting these curves to the user's selective action of pressing the lightness-adjustment key, resulting in adjustment in lightness of a copy image output.

For darkening a copy image output, there is established through the above selective operation a gamma characteristic curve, i.e., a relationship in lightness between an input value and an output value defined such that increments of the output value with respect to the input value (i.e., the slope of the gamma curve) are lower in the region with the input value being lower, while increments of the output value with respect to the input value are higher in the region with the input value being higher.

On the other hand, for brightening a copy image output, there is established through the above selective operation a gamma characteristic curve defined such that increments of the output value with respect to the input value are higher in the region with the input value being lower, while increments of the output value with respect to the input value are lower in the region with the input value being higher.

The above technique, since is originated for adjusting lightness or brightness, is considered to be a technique of adjusting the lightness "L" when viewed in an L*a*b* color space. With this in mind, conventionally, the adjustment is performed at only the first gamma corrector 101 on a reading side of the instant apparatus, independent of the second gamma corrector 104 on a recording side of the instant apparatus.

On the other hand, as disclosed in Japanese Patent Publications No. HEI 10-79888 and No. 2003-46779, for example, there is known in the field of an image capture device such as a digital camera and a video camera, a technique of modifying a gamma characteristic for use in a gamma correcting processing for image data of a captured image, thereby varying the density of an output image.

BRIEF SUMMARY OF THE INVENTION

Conventionally, color copier and multi-function apparatuses incorporating a copying function each perform adjustment in lightness of a copy image output depending on the user's operation via the lightness-adjustment key, through a gamma correction processing for image data produced by the color scanner to represent the image of an original document captured by the color scanner.

As a result, these conventional apparatuses, when the lightness of a copy image output is requested to be adjusted to a set value apart from the standard lightness value in the darkening direction, fails to increase in density a darker portion of the original document while preserving the color balance thereof. These conventional apparatuses therefore suffer from a drawback that the resulting copy image output is unintendedly blacked out (darkened) due to generation of image data of a K color component, depending on the circumstances.

Describing the reasons more specifically, once an input value of image data indicative of a dark image having low RGB values is converted into the corresponding output value according to the gamma characteristic curve as illustrated in FIG. 11, the corresponding output value tends not to faithfully reflect small changes of the input value on a color-by-color basis, resulting in deterioration of color balance.

In other words, as a result of the above conversion, the input value of the color converter 102, i.e., the output value of the first gamma corrector 101 is produced as image data which is similar to so-called achromatic color data hard to represent differences between colors. For this reason, the UCR processor 103 tends to unintendedly emphasize a K color component.

In an example illustrated in FIG. 12, the UCR processor 103 produces image data of a K color component, using the minimum one of C, M, and Y color levels VC, VM, VY represented by image data of C, M, and Y color components, according to a given level conversion look-up table. The UCR processor 103 subtracts a K color level VK of the produced image data of a K color component, from the C, M, and Y color levels VC, VM, VY, respectively, thereby modifying the C, M, and Y color levels VC, VM, and VY, respectively.

More specifically, in the example of FIG. 12, the K color level VK is determined according to the given level conversion look-up table, from the C color level VK represented by image data indicative of a C color component, which is lower than the M and Y color levels VM, VY. To represent the determined K color level VK, image data of a K color component is produced. Further, the C, M, and Y color levels VC, VM, VY represented by the image data indicative of C, M, and Y color components are modified into "(VC-VK)," "(VM-VK)," and "(VY-VK)," respectively.

It is added that, the ratio of the K color level VK to the referenced color level (the C color level VC, in the example of FIG. 12) may be determined in the designing stage, depending on the circumstances. More specifically, the K color level VK, although, in the example of FIG. 12, is determined to be almost a half of the original C color level VC, may be determined to be approximately the same as the original C color level VC, causing the resulting C color level VC to be zeroed, for example.

Referring back to FIG. 11, as explained above, upon request from the user through operation via the lightness-adjustment key for adjusting the lightness value in a direction to darken an output image to below the standard lightness value, one of a plurality of candidate gamma characteristic curves which is assigned a darkening direction as a direction to adjust the lightness value is selected.

Accordingly, the output value, outputted from the first gamma corrector 101, and being indicative of image data of R, G, and B color components, is produced as a value lower than a value to be selected when the standard lightness value is requested, i.e., as a value representing an image darker than when the standard lightness value is requested, in the region with the input value being lower.

As a result, the output value of the color converter 102, because of C, M, and Y colors being complementary to R, G, and B colors, is produced as a value representing an image higher than a value to be selected when the standard lightness value is requested, i.e., as a value representing an image darker than when the standard lightness value is requested.

The thus-produced output value of the color converter 102, although will be eventually entered into the UCR processor 103, has been produced as image data which is similar to so-called achromatic color data hard to represent differences between colors (R, G, and B), as described above. As a result, the output value, outputted from the color converter 103, and represented by image data of C, M, and Y color components, has been produced as image data smaller in difference in color level between those colors, as well. Therefore, a K color component is unnecessarily emphasized at the UCR processor 103, seemingly resulting in black-out of a full output image.

FIGS. 13(a)-13(e) illustrate in graph examples of sets of image data indicative of C, M, Y, and K color components which are produced at the UCR processor 103. These sets of image data are produced, after image data indicative of a darker portion of a captured image by the color scanner is gamma-corrected by the first gamma corrector 101 to achieve the standard lightness value.

On the other hand, FIGS. 14(a)-14(e) illustrate in graph examples of sets of image data indicative of C, M, Y, and K color components which are produced at the UCR processor 103. These sets of image data are produced, after image data indicative of the same darker portion is gamma-corrected by the first gamma corrector 101 according to a gamma characteristic curve for achieving a lightness value lower (darker) than the standard lightness value.

In FIGS. 13(a)-13(e) and 14(a)-14(e), color levels of per-color image data are each represented after normalization in which a maximum level ("255" for 8-bit image data, for example) of the original image data level is scaled into "1.0."

More specifically, FIGS. 13(a) and 14(a) each illustrate sets of image data indicative of R, G, and B color components entered into the first gamma corrector 101. FIGS. 13(b) and 14(b) each illustrate sets of image data indicative of R, G, and B color components outputted from the first gamma corrector 101. FIGS. 13(c) and 14(c) each illustrate sets of image data indicative of C, M, and Y color components outputted from the color converter 102. FIGS. 13(d) and 14(d) each illustrate sets of image data indicative of C, M, Y, and K color components outputted from the UCR processor 103. FIGS. 13(e)

and 14(e) each illustrate sets of image data indicative of C, M, Y, and K color components outputted from the second gamma corrector 104.

It is added that, a relationship between FIGS. 13(b) and 13(c) and a relationship between FIGS. 14(b) and 14(c) each reflect the characteristic of the conversion performed at the color converter 102, for the above two cases different in desired lightness value, respectively. On the other hand, the fact that R, G, and B colors are complementary to C, M, and Y colors, respectively, originally leads to the result that the C, M, and Y color values equal the corresponding respective R, G, and B color values minus "1."

However, the color converter 102 is adapted to incorporate a look-up table "LUP" for absorbing differences in color gamut (color reproduction range) between the color scanner on a reading side and the color printer on a recording side. Therefore, those two relationships do not exhibit the thus-originally-led result.

FIG. 15 illustrates in graph an example of a first gamma characteristic curve selected by the first gamma corrector 101 upon request for the standard lightness value. FIG. 16 illustrates in graph a UCR gamma characteristic curve selected by the UCR processor 103 upon request for the standard lightness value. FIG. 17 illustrates in graph an example of a second gamma characteristic curve selected by the second gamma corrector 104 upon request for the standard lightness value.

In the examples of FIG. 13, as illustrated in FIG. 13(c), sets of image data indicative of C, M, and Y color components outputted from the color converter 102 are formed such that the C color level VC represented by image data of a C color component is very low, and therefore, a threshold level allowing the UCR processor 103 to generate a K color component is not reached.

As a result, as illustrated in FIGS. 13(d) and 16, the UCR processor 103 does not produce a K color level VK represented by image data of a K color component, thereby preserving the color balances of an original document captured by the color scanner.

In contrast, once the lightness value is requested via the lightness-adjustment key to be adjusted to a set value lower (darker) than the standard lightness value, the output value is reduced with respect to the same input value, as illustrated in FIG. 11, the levels of image data of R, G, and B color components, upon gamma-corrected by the first gamma corrector 101, become so low that even the maximum color level, which is represented by image data of a R color component, is not higher than "0.32," as illustrated in FIG. 14(b).

As a result, the levels of image data of C, M, and Y color components, upon produced from such image data of R, G, and B color components, all become so high that even the minimum color level, which is represented by image data of a C color component, exceeds "0.5," as illustrated in FIG. 14(c).

Therefore, the threshold level allowing the UCR processor 103 to generate a K color component is reached, and the level of image data of a K color component outputted from the second gamma corrector 104 also becomes very high, as illustrated in FIG. 14(e). As a result, once an image is formed on a recording paper using such image data of C, M, Y, and K color components, the image seems to be blacked out due to the high-level K color component.

In the examples of FIGS. 13 and 14, when compared with respect to the color balance expressed in terms of the ratio of C:M:Y, the color balance of a copy image output undergoing the gamma correction to achieve the standard lightness value is, as illustrated in FIG. 13(e):

1:6:9, while the color balance of a copy image output undergoing the gamma correction to achieve the lightness value lower (darker) than the standard lightness value is, as illustrated in FIG. 14(e):

1:1.82:1.67.

This comparison demonstrates that, conventionally, the adjustment of the lightness value to become darker than the standard lightness value invites a large change in color balance, leading to a change in saturation, and emphasis in blackness of the changed color.

FIGS. 18(a)-18(c) illustrate in graph, in terms of an L*a*b* color space, a change in position of a color from position A to position B as a result of the conversion according to the first gamma characteristic curve, for the sake of easy understanding.

More specifically, FIG. 18(a) illustrates in perspective view the L*a*b* color space, FIG. 18(b) illustrates an L*a* color plane, and FIG. 18(c) illustrates an a*b* color plane.

FIGS. 18(a)-18(c) together demonstrate that the adjustment in lightness in the darkening direction via the user's operation of the lightness-adjustment key not only reduces the lightness value "L" in the L*a*b* color space, but also performs an unintended modification to the saturation represented in the a*b* color plane.

In addition, the true intent of a user who actually operates the lightness-adjustment key in the darkening direction lies, not in that the user wishes to darken the resulting copy image output, but in that, since the copy image output is too light (pale) to be visible, the user wishes the copy image output to become more clearly visible by increasing the image density. It can be recognized that such a user's operation does not truly mean a request for darkening, but a request for enhancing distinctness or definition.

As a result, an added limitation is encountered with the above-described conventional apparatuses that a mere adjustment in lightness fails to such an adequate adjustment as to fulfill a user's true need correctly.

More specifically, conventionally, the adjustment in lightness in the darkening direction basically means a mere adjustment in brightness. Therefore, even though a copy image output which is lighter (paler) (i.e., which lacks density differences between colors) is darkened, all that results from is the darkening of the entire copy image output, with density differences between colors not being enhanced.

It is therefore an object of the present invention to provide a technique, upon request for darkening (decreasing in lightness) an image output corresponding to an original, of increasing in saturation the copy image output while preserving the lightness of the original.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings:

FIG. 18 is a set of graphs for explaining in terms of an L*a*b* color space a change in position of a color from position A to B upon conversion according to the first gamma characteristic curve, wherein FIG. 18(a) is a perspective view of the L*a*b* color space, FIG. 18(b) is a plan view of an L*a* color plane, and FIG. 18(c) is a plane view of an a*b* color plane.

DETAILED DESCRIPTION OF THE INVENTION

Figure 1:
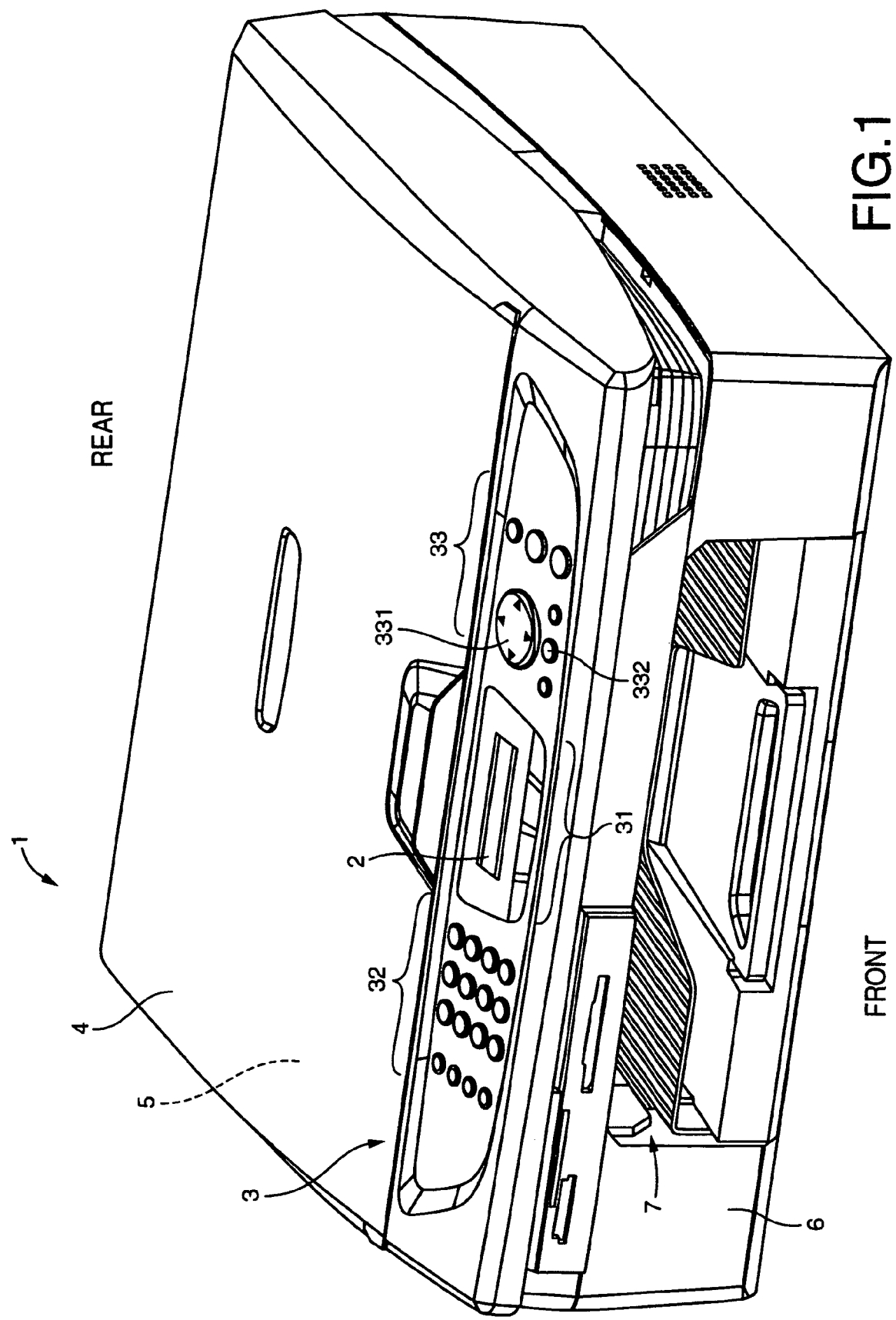
FIG. 1 is a perspective view illustrating the exterior of a multi-function apparatus as an example of an image forming apparatus constructed according to an embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for forming an image, comprising:

an input device inputting image data;

an image processor processing the inputted image data;

an image forming device forming the image on a recording medium, based on the processed image data;

a lightness setting device setting a lightness value of the image to be formed on the recording medium by the image forming device;

a first corrector correcting the inputted image data according to a first correction characteristic;

a first characteristic modifier modifying the first correction characteristic, in response to setting of increasing the lightness value by the lightness setting device;

a second corrector correcting the processed image data according to a second correction characteristic; and a second characteristic modifier modifying the second correction characteristic, in response to setting of decreasing the lightness value by the lightness setting device.

Once a correction is made to image data to meet the user's request (request for low lightness adjustment) for darkening (increasing in image density) an image to be formed on a recording medium, prior to a specified image processing (e.g., a color conversion from image data formed in terms of additive-color-based three primary colors, into recording data formed in terms of subtractive-color-based three primary colors), there may be caused changes in color balance from the original, leading to changes in saturation, and emphasis in blackness at the changed colors. If this is the case, the image is formed on the recording medium so as to be globally darkened, without enhancement in density differences between colors and in definition, of the image.

By contract, once a correction is made to image data to meet the user's request (request for low lightness adjustment) for darkening (increasing in image density) an image to be formed on a recording medium, after the above specified image processing, the image is allowed to be formed with the color balance being preserved and with saturation being improved. For such a request issued from the user for low lightness adjustment, an increase in saturation of the image formed on the recording medium is in conformity with the true intent of the user who issues such a request.

Based on the above findings, in the apparatus according to the above mode (1), upon setting of increasing in lightness of the image to be formed on the recording medium, i.e., request from the user for high lightness adjustment, a required correction is made to the inputted image data, while, upon setting of decreasing in lightness of the image to be formed on the recording medium, i.e., request from the user for low lightness adjustment, a required correction is made to the processed image data.

As a result, the apparatus according to the above mode (1), upon request from the user for high lightness adjustment, the luminance of the image formed on the recording medium is increased, while, upon request from the user for low lightness adjustment, the saturation of the image formed on the recording medium is improved while preserving the lightness between the original and the formed image, resulting in image data being corrected in conformity with the true intent of the user.

(2) The apparatus according to mode (1), wherein the input device includes a capturing device capturing an image of an original document to produce the image data.

(3) The apparatus according to mode (1) or (2), wherein the first characteristic modifier is inhibited from modifying the first correction characteristic, in response to setting of decreasing the lightness value by the lightness setting device.

(4) The apparatus according to any one of modes (1)-(3), wherein the second characteristic modifier is inhibited from modifying the second correction characteristic, in response to setting of increasing the lightness value by the lightness setting device.

(5) The apparatus according to any one of modes (1)-(4), wherein the lightness setting device is capable of setting the lightness value in steps, wherein the first characteristic modifier modifies the first correction characteristic to achieve one of a plurality of first correction characteristic curves which corresponds to the lightness value set by the lightness setting device, and wherein the second characteristic modifier modifies the second correction characteristic to achieve one of a plurality of second correction characteristic curves which corresponds to the lightness value set by the lightness setting device.

The apparatus according to the above mode (5) allows multi-step adjustment in condition of the image formed on the recording medium.

(6) The apparatus according to mode (5), wherein the first characteristic modifier modifies the first correction characteristic, based on a first basic correction-characteristic-curve which represents a basis of the first correction characteristic, and a content of setting by the lightness setting device, and wherein the second characteristic modifier modifies the second correction characteristic, based on a second basic correction-characteristic-curve which represents a basis of the second correction characteristic, and the content of the setting by the lightness setting device.

The apparatus according to the above mode (6) may be practice in an arrangement in which the first and second characteristic modifiers each use data of a single basic correction-characteristic-curve forming the basis of the resulting corresponding correction characteristic, and in which, each of the characteristic modifiers obtains by-calculation the resulting corresponding correction characteristic conforming with the lightness value set by the lightness setting device, based on the corresponding basic correction-characteristic-curve.

The above arrangement, owing to the correction characteristic curve which is assigned to each of the characteristic modifiers being no larger than "1," facilitates reduction in capacity of a memory required for storing data of the correction characteristic curves.

(7) The apparatus according to mode (5), wherein the first characteristic modifier modifies the first correction characteristic, by selecting one of a plurality of first candidate correction-characteristic-curves which represent a plurality of candidates of the first correction characteristic, respectively, which corresponds to a content of setting by the lightness setting device, and wherein the second characteristic modifier modifies the second correction characteristic, by selecting one of a plurality of second candidate correction-characteristic-curves which represent a plurality of candidates of the second correction characteristic, respectively, which corresponds to the content of the setting by the lightness setting device.

(8) The apparatus according to any one of modes (1)-(7), wherein the first characteristic modifier modifies the first correction characteristic, based on a first basic correction-characteristic-curve which represents a basis of the first correction characteristic, and a content of setting by the lightness setting device, and wherein the second characteristic modifier modifies the second correction characteristic, based on a second basic correction-characteristic-curve which represents a basis of the second correction characteristic, and the content of the setting by the lightness setting device.

In the apparatus according to the above mode (8), each of the first and second characteristic modifiers obtains the corresponding correction characteristic conforming in content with the setting by the lightness setting device, based on the corresponding basis correction-characteristic-curve, and the content of the setting by the setting device.

(9) The apparatus according to mode (8), wherein the first characteristic modifier modifies the first correction characteristic, based on a first factor variable depending on the content of the setting by the lightness setting device, and a first function defining the first basic correction-characteristic-curve.

(10) The apparatus according to mode (9), wherein the first factor is smaller than one and is used for dividing a pre-selected first variable.

In the apparatus according to the above mode (10), the first characteristic modifier obtains the correction characteristic curve conforming in content with the setting by the lightness setting device, by dividing the first variable of the first basic correction-characteristic-curve, by the first factor conforming in content with the setting by the setting device.

(11) The apparatus according to mode (10), wherein the first function is defined as a function of a first input value represented by the inputted image data, wherein the first variable includes the first input value, and wherein the first characteristic modifier compensates the first input value by dividing the first input value by the first factor, and delivers the compensated first input value to the first corrector, to thereby modify the first correction characteristic.

In the apparatus according to the above mode (11), the first characteristic modifier obtains the correction characteristic curve conforming in content with the setting by the lightness setting device, by dividing the first input value (an input value of the correction characteristic) represented by the image data inputted by the input device, by the first factor conforming in content with the setting by the setting device.

(12) The apparatus according to any one of modes (8)-(11), wherein the second characteristic modifier modifies the second correction characteristic, based on a second factor variable depending on the content of the setting by the lightness setting device, and a second function defining the second basic correction-characteristic-curve.

(13) The apparatus according to mode (12), wherein the second factor is smaller than one and is used for dividing a pre-selected second variable.

In the apparatus according to the above mode (13), the second characteristic modifier obtains the correction characteristic curve conforming in content with the setting by the lightness setting device, by dividing the second variable of the second basic correction-characteristic-curve, by the second factor conforming in content with the setting by the lightness setting device.

(14) The apparatus according to mode (13), wherein the second function is defined as a function of a second input value represented by the processed image data, wherein the second variable includes the second input value, and wherein the second characteristic modifier compensates the second input value by dividing the second input value by the second factor, and delivers the compensated second input value to the second corrector, to thereby modify the second correction characteristic.

In the apparatus according to the above mode (14), the second characteristic modifier obtains the correction characteristic curve conforming in content with the setting by the lightness setting device, by dividing the second input value (an input value of the correction characteristic) represented by the image data processed by the image processor, by the second factor conforming in content with the setting by the lightness setting device.

(15) The apparatus according to mode (8), wherein the first basic correction-characteristic-curve is defined by a first function of a first input value represented by the inputted image data, and wherein the first characteristic modifier compresses a range of the first input value, depending on the content of the setting by the lightness setting device, to thereby modify the first correction characteristic.

In the apparatus according to the above mode (15), the first characteristic modifier obtains the correction characteristic curve conforming in content with the setting by the lightness setting device, by compressing the range of the first input value (an input value of the correction characteristic) represented by the image data inputted by the input device, depending on the content of the setting by the lightness setting device.

(16) The apparatus according to mode (15), wherein the first characteristic modifier compresses the range of the first input value using a first factor variable depending on the content of the setting by the lightness setting device.

(17) The apparatus according to mode (16), wherein the first factor is smaller than one and is used for dividing the range of the first input value.

The apparatus according to the above mode (17) may be practice in an arrangement in which the first characteristic modifier compresses the range of the first input value (an input value of the correction characteristic) represented by the image data inputted by the input device, by multiplying the first input value by the first factor smaller than one. The arrangement allows the range compression processing in a shortened length of time.

(18) The apparatus according to any one of modes (8) and (15)-(17), wherein the second basic correction-characteristic-curve is defined by a second function of a second input value represented by the processed image data, and wherein the second characteristic modifier compresses a range of the second input value, depending on the content of the setting by the lightness setting device, to thereby modify the second correction characteristic.

In the apparatus according to the above mode (18), the second characteristic modifier obtains the correction characteristic curve conforming in content with the setting by the lightness setting device, by compressing the range of the second input value (an input value of the correction characteristic) represented by the image data processed by the image processor, depending on the content of the setting by the lightness setting device.

(19) The apparatus according to mode (18), wherein the second characteristic modifier compresses the range of the second input value using a second factor variable depending on the content of the setting by the lightness setting device.

(20) The apparatus according to mode (19), wherein the second factor is smaller than one and is used for dividing the range of the second input value.

The apparatus according to the above mode (20) may be practice in an arrangement in which the second characteristic modifier compresses the range of the second input value (an input value of the correction characteristic) represented by the image data processed by the image processor, by multiplying the second input value by the second factor smaller than one. The arrangement allows the range compression processing in a shortened length of time.

(21) The apparatus according to any one of modes (8)-(20), wherein the first basic correction-characteristic-curve defines a relationship between the first input value and the first output value such that a rate of change of the first output value with respect to the first input value is higher with the first input value being smaller, while the rate of change is lower with the first input value being higher.

(22) The apparatus according to any one of modes (8)-(21), wherein the second basic correction-characteristic-curve defines a relationship between the second input value and the second output value such that a rate of change of the second output value with respect to the second input value is higher with the second input value being smaller, while the rate of change is lower with the second input value being higher.

In the apparatus according to the above mode (22), the correction characteristic curve for use in correcting the image data by the second corrector upon request for low lightness adjustment issued via the lightness setting device, the ratio of the output value to the input value is higher when the input value is lower than when the input value is higher.

As a result, the apparatus according to the above mode (22) prevents the image data from being altered to achromatic color data, in response to the request for low lightness adjustment issued via the lightness setting device when the input value is lower.

(23) The apparatus according to any one of modes (1)-(22), wherein the image processor comprises a converter converting the image data, inputted by the input device, indicative of R (red), B (green), and B (blue) color components, into recording data, for use in the image processor, indicative of C (cyan), M (magenta), Y (yellow), and K (black) color components, wherein the first corrector uses for the image data first individual correction-characteristic-curves on a color component basis, and wherein the second corrector uses for the recording data second individual correction-characteristic-curves on a color component basis.

The apparatus according to the above mode (23), owing to the capability of setting the correction characteristic curves on a color-by-color basis, facilitates the adjustment in lightness of the image formed on the recording medium, while preserving the color balance more appropriately.

(24) The apparatus according to mode (23), wherein the image data represents the image on a color component basis in terms of a additive-color-based three-primary-color system, and wherein the recording data represents the image on a color component basis in terms of a subtractive-color-based three-primary-color system.

(25) A method of forming an image, comprising the steps of:

inputting image data;

processing the inputted image data;

forming the image on a recording medium, based on the processed image data;

setting a lightness value of the image to be formed on the recording medium by the image forming device;

correcting the inputted image data according to a first correction characteristic;

modifying the first correction characteristic, in response to setting of increasing the lightness value by the step of setting;

correcting the processed image data according to a second correction characteristic; and modifying the second correction characteristic, in response to setting of decreasing the lightness value by the step of setting.

The method according to the above mode (25) provides substantially the same effects as those of the apparatus according to the above mode (1). The method according to the above mode (25) may be practiced in combination with at least one technical feature set forth in at least one of the above mode (2)-(24).

(26) A program executed by a computer for practicing the method according to mode (25).

The execution of this program by a computer provides substantially the same effects as those of the method according to the above mode (25).

The "program" in the present mode (25) may be interpreted to incorporate not only a combination of instructions implemented by a computer to perform the functions of the program, but also files, data, etc. processed depending on each of the instructions.

Several presently preferred embodiments of the invention will be described in detail by reference to the drawings in which like numerals are used to indicate like elements throughout.

Referring now to FIG. 1, there is illustrated in perspective view the exterior of a multi-function apparatus 1 which is an example of an image forming apparatus constructed according to an embodiment of the present invention.

The multi-function apparatus 1, although incorporates a plurality of functions such as a color copying function, a facsimile function, a printing function, and a scanning function, will be described chiefly on lightness adjustment of a copy image output for use in performing the copying function, in view of the fact that the present invention is directed to lightness adjustment of an output image.

As illustrated in FIG. 1, the multi-function apparatus 1, in the shape of a box short in height, includes on an upper face of the multi-function apparatus 1 at its front end, a control panel 3 having a display portion 2. The multi-function apparatus 1 further includes on its upper face behind the control panel 3, a cover 4 openable at its front side, and a document support surface 5 (invisible due to the cover 4 being placed in the closed position in FIG. 1) allowing an original document to be supported thereon, with the document support surface 5 being open by placing the cover 5 in an open position (now shown). The original document is a subject to be image-captured when the scanning function or the copying function is performed. The document support surface 5 can accommodate an A4-sized document at the maximum, for example.

To the multi-function apparatus 1 at its front face portion, a recording-paper receiver tray 6 is removably attached, and above the recording paper receiver tray 6, a recording-paper exit tray 7 is disposed to hold a recording paper which is reversed and printed inside of the multi-function apparatus 1, and which is subsequently ejected outside of the multi-function apparatus 1.

For executing the facsimile function (more specifically, its transmission sub-function), the original document supported on the document support surface 5 is red or image-captured to produce image data by an image reader 10 as described later, which is disposed in the multi-function apparatus 1. Then, the produced image data is transmitted in response to a user's action of pressing a transmission request key (not shown).

Figure 3A:
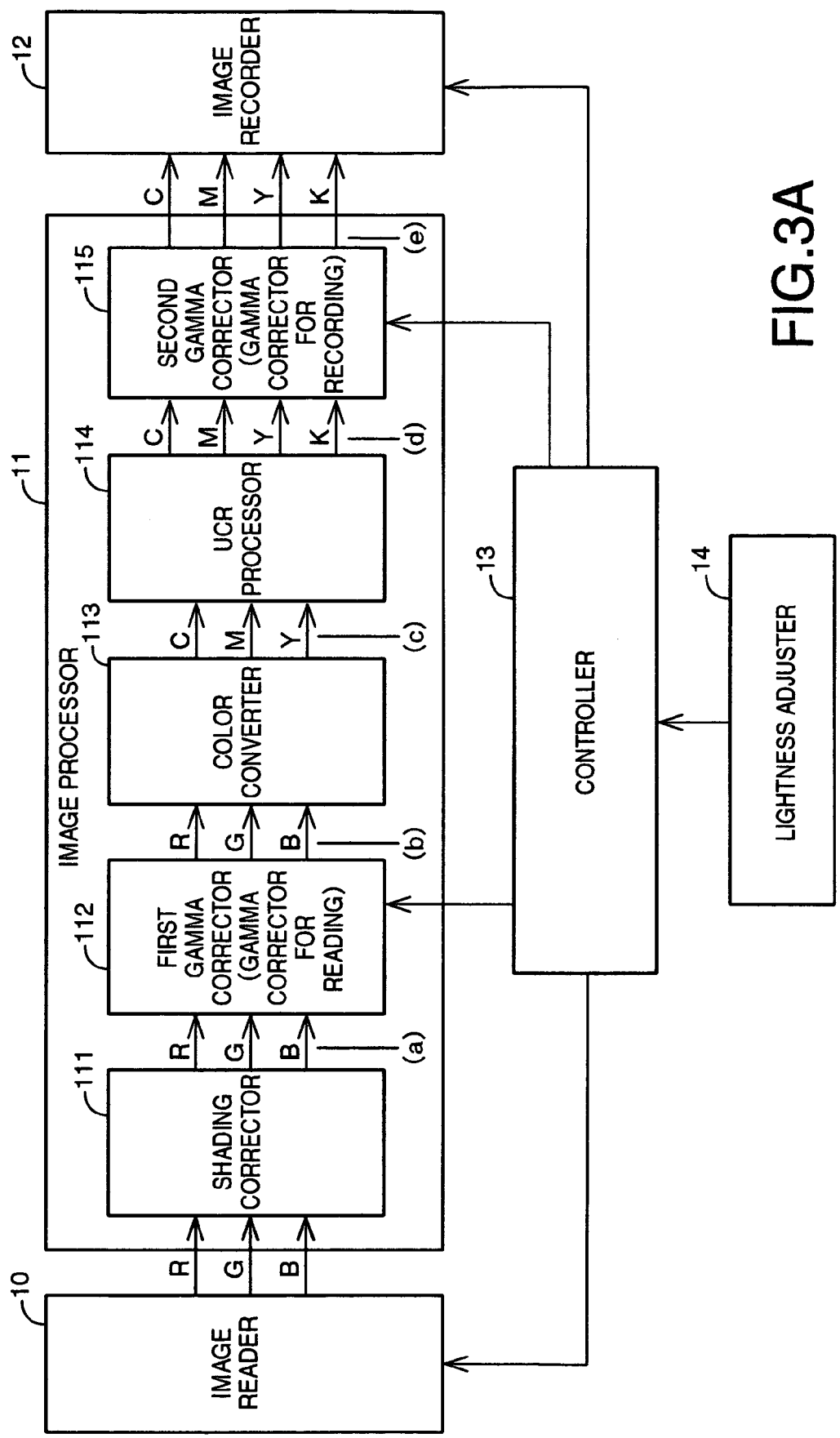
FIG. 3A is a functional block-diagram for explaining a copying function of the multi-function apparatus illustrated in FIG. 1.
Figure 3B:
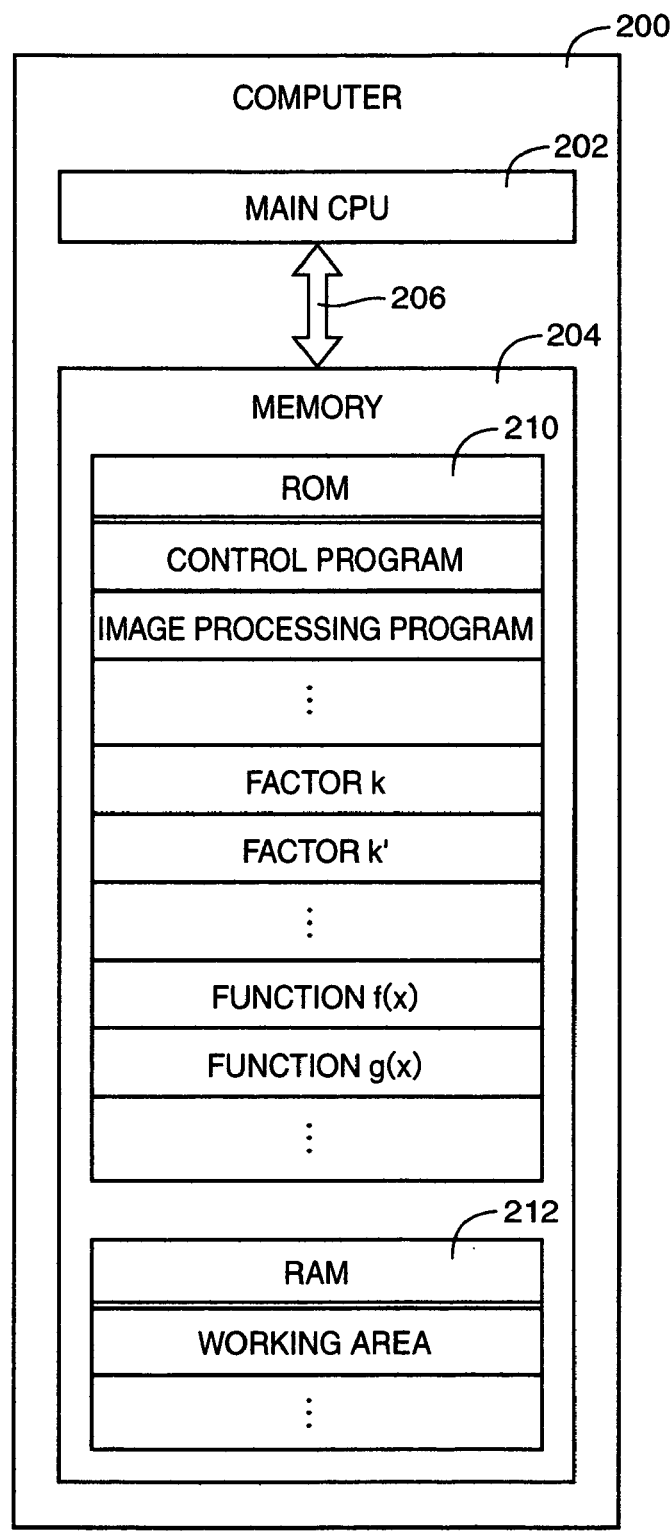
FIG. 3B schematically illustrates in block diagram a computer of the multi-function apparatus illustrated in FIG. 1.

In an effort to transmit together a plurality of successive pages as an original document to a remote recipient, a combined operation of loading and capturing the image of a selected one of these original pages on the document support surface 5; and exchanging the image-captured page to a next page, is sequentially repeated a required number of times, for producing image data indicative of the plurality of successive pages, and storing the image data in a memory 204 shown in FIG. 3B. The image data, after stored, is transmitted in response to the user's action of pressing the aforementioned transmission request key.

It is added that, the above page exchange, although is manually made by the user in the present embodiment, may of course be made in a manner that an additional mechanism generally referred to as "ADF (Automatic Document Feeder)" in the art allows the plurality of successive pages to be automatically fed and image-captured.

In addition, for executing the facsimile function (more specifically, its reception sub-function) or the copying function, the recording paper received by the recording-paper receiver tray 6 is fed into the multi-function apparatus 1 via a feeder (not shown), an image is formed on the recording paper by means of an image recording section 12 disposed within the multi-function apparatus 1, and then the recording paper, upon printed, is ejected to the recording-paper exit tray 7 at the front face portion of the multi-function apparatus 1.

The display portion 2, which is disposed at the center of the control panel 3, is made of an LCD having a multiplicity of pixels in a matrix array. The display portion 2 is adapted to display, using dot-formatted characters or symbols, the date, the time of the day, various kinds of sets of setting information to be presented to the user for each of the aforementioned functions (destinations, telephone numbers, etc., for the facsimile function, and the number of copies, etc., for the copying function), the status in operation, error messages, etc.

A control area 31 is assigned below the display portion 2, and control areas 32, 33 are assigned at the left-hand and the right-hand end portion of the control panel 3, respectively, wherein each control area 31, 32, 33 is provided with a plurality of control buttons.

The control area 31, which is located below the display portion 2, is provided for allowing the user to select any one of the facsimile function, the copying function, the scanning function, and a photo-media capturing function (a function of printing an image captured with a digital camera). The control area 31 is provided with four control buttons corresponding to these four functions.

The control area 32, which located at the left-hand end portion of the control panel 3, is provided mainly for allowing the user to operate for telephone communication, etc. The control area 32 is provided with sixteen control buttons, four of which are arrayed at the left-hand end for allowing the user to operate for events of power on/off, re-dial, on-hook, etc, and the remaining twelve of which are arrayed at the right-hand end for allowing the user to enter telephone numbers, etc. The latter twelve control buttons are in the form of twelve numeric keys.

The control area 33, which located at the right-hand end portion of the control panel 3, is provided mainly for allowing the user to operate for image recording and to set conditions of each of the aforementioned functions.

The control area 33 is provided with six control buttons and a cursor key 331 (an integrated 4-way arrow key, or a cross-shaped key) 331. Three of the six control buttons are located on the right of the cursor key 331 for allowing the user to instruct a copy stop, a color copy, and a monochrome copy, respectively. The remaining three of the six control buttons are located below the cursor key 331 for allowing the user to select items for operation conditions of each of the aforementioned functions. One of the latter three control buttons is numbered "332." The cursor key 331 is located on the right of the display portion 2.

The control button 332, located at the center of the lower portion of the cursor key 331, is assigned as a control button (hereinafter, referred to as "menu/set button 332") for the user to instruct the multi-function apparatus 1 to display a menu picture on the display portion 2, and for the user to finally select one of selectable items included in the menu picture. The menu picture includes an item to be selected by the user who wishes to achieve the lightness adjustment, and an item to be selected by the user who wishes to specify a value to which the lightness is to be adjusted, to both of which the present invention is directed. Pressing of the menu/set button 332 causes the multi-function apparatus 1 to display a portion of the menu picture on the display portion 2.

The cursor key 331 can be selectively used to function as a screen scroll key enabling the user to scroll the menu picture on the screen of the display portion 2 for viewing an invisible portion of the entire menu picture. The cursor key 331 can be selectively used to function as a select key enabling the user to select at least one of a plurality of optional items presented on the display portion 2, which the user wishes to set.

In response to the user's action of selectively operating upper and lower key portions 331a, 331b (see FIG. 2) of the cursor key 331, the menu picture is scrolled accordingly. The user's selective operation of these upper and lower key portions 331a, 331b allows the presentation on the display portion 2 a corresponding one of the plurality of items to the lightness adjustment of a copy image output to which the present invention is directed.

Figure 2:
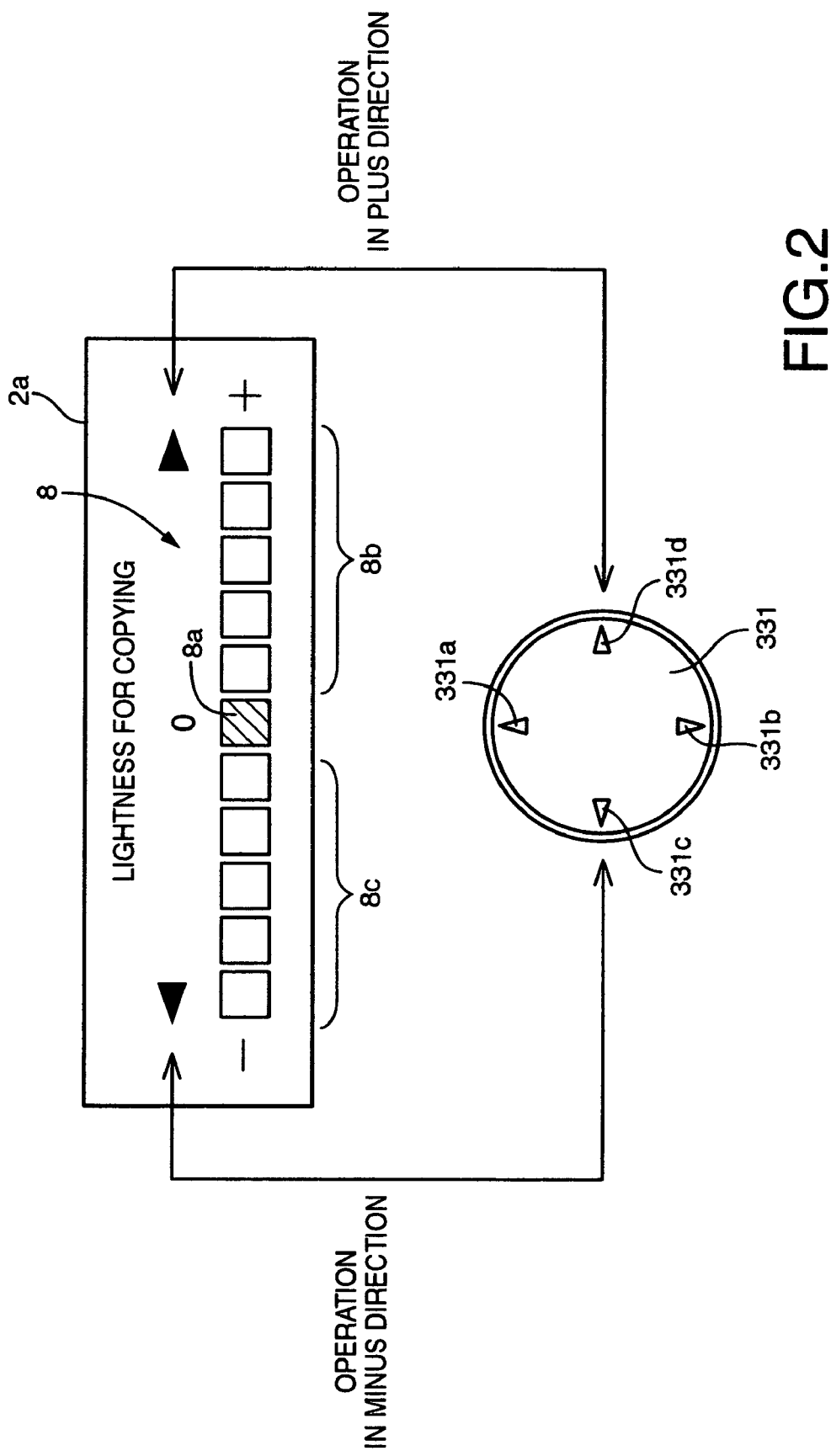
FIG. 2 illustrates an example of a picture displayed on a display screen for use in lightness adjustment of a copy image output, together with a cursor key, of the multi-function apparatus illustrated in FIG. 1.

FIG. 2 illustrates an example of the screen image displayed for supporting the lightness adjustment of a copy image output.

The textual representation "lightness for copying" located at the top of the display screen 2a of the display portion 2 represents an item name corresponding to the lightness adjustment. A set of eleven square-shaped representations located at the bottom of the display screen 2a represents a marking set (indicator set) 8 including eleven individual lightness-adjustment-value markings 8a, 8b, 8c, one of which is centered and numbered "8a," five of which are located on the right-hand side and each numbered "8b," and the remaining five of which are located on the left-hand side and each numbered "8c."

The marking set 8 is operated to indicate a lightness value (hereinafter, referred to as "lightness-adjustment-value") to be achieved as a result of the lightness adjustment.

The present embodiment according to the present invention is configured to perform the lightness adjustment operation such that the lightness value is adjusted relative to a predetermined standard lightness value (e.g., a default value for the lightness), in a selected one of a minus (−) direction allowing the lightness value to be reduced, and a plus (+) direction allowing the lightness value to be increased, at given intervals, in five stages from the standard lightness value to each of the two extreme values.

The lightness-adjustment-value marking 8a disposed at the center of the marking set 8, indicates, when enabled, that the actual lightness value equals the standard lightness value.

The five lightness-adjustment-value markings 8b disposed on the right of the lightness-adjustment-value marking 8a, each indicate, when enabled, that the lightness adjustment is in a brightening stage for globally brightening a copy image output to become higher in lightness than the standard lightness value.

The remaining five lightness-adjustment-value markings 8c disposed on the left of the lightness-adjustment-value marking 8a, each indicate, when enabled, that the lightness adjustment is in a darkening stage for globally darkening a copy image output to become lower in lightness than the standard lightness value.

One of the plurality of lightness-adjustment-value markings of the marking set 8, which corresponds to a currently-selected lightness-adjustment-value, is displayed in reverse (in black color). In the example illustrated in FIG. 2, the reversal presentation of the lightness-adjustment-value marking 8a indicates that the standard lightness value has been selected as the lightness-adjustment-value.

Each time that a right-hand key portion 331d of the cursor key 331 is pressed down, the marking set 8 is successively changed in state so as to indicate that the currently-selected lightness-adjustment-value is successively changed in magnitude in the brightening direction (plus direction) at every one step. On the other hand, each time that a left-hand key portion 331c of the cursor key 331 is pressed down, the marking set 8 is successively changed in state so as to indicate that the currently-selected lightness-adjustment-value is changed in magnitude in the darkening direction (minus direction) at every one step.

If the user presses down the menu/set button 332, with one of the plurality of lightness-adjustment-value markings 8a, 8b, 8c of the marking set 8, which corresponds to a desired lightness value, being displayed in reverse (in black color), then the lightness-adjustment-value is set to the desired lightness value.

Upon the lightness-adjustment-value of a copy image output being set to be different from the standard lightness value, in the case where the set value of the lightness-adjustment-value is higher (brighter) than the standard lightness value, a gamma correction is performed for sets of image data indicative of R, G, and B color components, respectively, by means of a gamma corrector 112 for reading (see FIG. 3A) as described later, with the related gamma characteristic (expressed by "y=f(x)" in FIG. 4, for example) being modified such that an output value "y" (see FIG. 4) becomes higher with respect to the same input value "x" than when the standard lightness value is selected.

Figure 4:
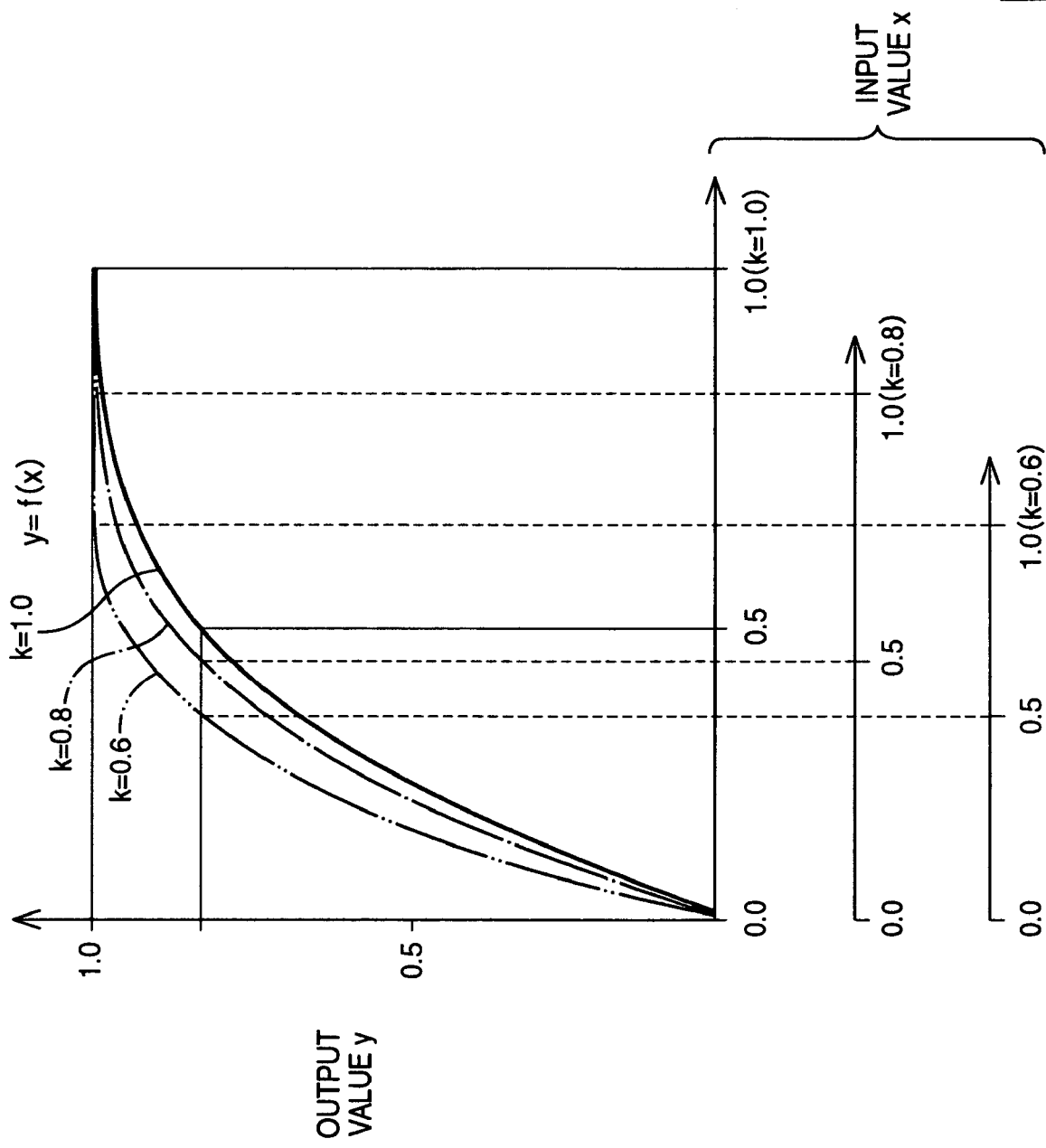
FIG. 4 is a graph for explaining a relationship between a gamma correction processing and a gamma characteristic, for a gamma corrector for reading illustrated in FIG. 3A.

In this case, the gamma correction is performed using the modified gamma characteristic, with the result that the entire region of a copy image output is adjusted to be increased in lightness, i.e., become brightened (see FIG. 4).

In contrast, in the case where the set lightness-adjustment-value is lower (darker) than the standard lightness value, the R, G, and B color components are converted at a color converter 113 (see FIG. 3A) into sets of image data indicative of C, M, Y, and K color components, respectively; a so-called black color removal is implemented at a UCR (Under Color Removal) processor 114 (see FIG. 3A); and a gamma correction is performed by a gamma corrector 115 for recording (see FIG. 3A) as described later, with the related gamma characteristic being modified such that an output value becomes higher with respect to the same input value than when the standard lightness value is selected.

In this case, the gamma correction is performed using the modified gamma characteristic, with the result that the entire region of a copy image output is adjusted to be darkened, i.e., increased in image density.

There will be described in greater detail later how to perform the lightness adjustment using these two types of the gamma corrections.

Referring back to FIG. 1, the user can set other conditions by operating the control panel 3 as follows:

Operate the menu/set button 332 for causing the display portion 2 to display the menu picture thereon;

Selectively operate the upper and lower key portions 331a, 331b of the cursor key 331 to select a desired one of the plurality of items included in the displayed menu picture;

Selectively operate the right- and left-hand key portions 331c, 331d of the cursor key 331 in association with the selected item, for selecting a value (hereinafter, referred to as "condition-specifying value") specifying each of the other conditions to a desired value; and Operate the menu/set button 332 for setting or fixing the condition-specifying value.

FIG. 3A is a block diagram functionally illustrating the copying function of the multi-function apparatus 1.

For performing the copying function, the multi-function apparatus 1 includes the image reader 10; an image processor 11; an image recorder 12; a controller 13; and a lightness adjuster 14.

The image reader 10 is for use in reading an original document loaded on the document support surface 5. The image reader 10 is constructed to include an illuminator for illuminating the original document loaded on the document support surface 5, and a color image sensor made up of photoelectric conversion elements for converting the optical image of the document into image signal.

The image reader 10 further includes a drive control circuitry for controlling the color image sensor with respect to an image reading operation thereof, and a signal processing circuitry for performing given signal processing operations for the image signal delivered from the color image sensor. The signal processing operations include an amplifying possessing, a converting processing between analog and digital signals, etc.

For the definitions of the expressions used for the following description, a direction along shorter ones of four sides of the rectangular-shaped document support surface 5 will be referred to as "width-wise direction" (also referred to as "main scanning direction," corresponding to the back-and-forth direction in FIG. 1), while a direction along longer ones of the four sides will be referred to as "length-wise direction" (also referred to as "sub-scanning direction," corresponding to the lateral direction in FIG. 1).

In construction, the above color image sensor includes a white color light source as an example of the aforementioned illuminator; a CCD line-image-sensor dimensioned to capture an image in a region having about the same length as the width-wise length of an A4-sized recording paper; and R, G, and B color filters which are disposed on an exposure surface of the CCD line-image-sensor and which are arrayed in the sub-scanning direction.

In operation, the image reader 10, while repeatedly causing the color image sensor to perform a unit operation for capturing the image of an original document loaded on the document support surface 5 in the width-wise direction on per sub-scan line basis, moves the color image sensor relative to the original document in the sub-scanning direction, to thereby capture the entire image of the original document.

The image reader 10 retrieves from the line image sensor the image signal (light sensitive signals for respective pixels) for each color component, each unit operation of capturing a subject image capture by the line image sensor. Further, the image reader 10, upon application to the image signal of given signal processing such as a signal amplification and a signal conversion into a digital signal (an A-D conversion of the light sensitive signal into a digital signal indicative of a tone level value in an 8-bit format, for example), delivers the image signal to the image processor 11.

The image processor 11 is configured to perform a shading correction for additive-color-based color sets of image data (sets of image data indicative of R, G, and B color components) delivered from the image reader 10, and to then produce subtractive-color-based sets of image data (sets of image data indicative or C, M, Y, and K color components) for use in recording the corresponding image by the image recorder 12.

As illustrated in FIG. 3A, the image processor 11 includes: a shading corrector 111; a first gamma corrector 112 (hereinafter, also referred to as the "gamma corrector 112 for reading"); the color converter 113; the UCR processor 114; and a second gamma corrector 115 (hereinafter, also referred to as the "gamma corrector 115 for recording").

Described roughly, the gamma corrector 112 for reading is adapted to perform the gamma correction for the additive-color-based sets of image data indicative of R, G, and B color components. The color converter 113 is adapted to convert or transform the subtractive-color-based sets of image data indicative of R, G, and B color components into sets of image data indicative of C, M, Y, and K color components.

The UCR processor 114 is adapted to perform the UCR processing in which an under color is removed to produce black color data, for the subtractive-color-based sets of image data indicative of C, M, Y, and K color components. The gamma corrector 115 for recording is adapted to perform the gamma correction for the subtractive-color-based sets of image data indicative of C, M, Y, and K color components.

More specifically, the shading corrector 111 is adapted to perform the shading correction for the image data entered from the image reader 10, which will be referred to as "captured-image data." In operation, the shading corrector 111 establishes a maximum level (reference white level) to be equal to the level represented by the image data obtained by causing the image reader 10 to capture a reference white color. The shading corrector 111 further establishes a minimum level (reference black level) to be equal to the level represented by the image data obtained by causing the image reader 10 to perform an image capture operation under no illumination.

The shading corrector 111 then compensates the level of the captured-image data inputted from the image reader 10 (the level of the pixel-wise light sensitive signal) to fall within a range between the reference black level and white level both established in the above manner. The shading corrector 111 performs the shading corrector per each of the R, G, and B color components.

The gamma corrector 112 for reading is for use in performing the gamma correction for the captured-image data upon application thereto of the shading correction. The gamma corrector 112 for reading is provided with the gamma characteristic per each of the R, G, and B color components.

In operation, the gamma corrector 112 for reading, with the set value of the lightness-adjustment-value of a copy image output being apart from the standard lightness value in the plus direction allowing the copy image output to become brighter than the standard, modifies the gamma characteristic which defines a relationship in lightness between an input value and an output value, such that the output value is increased with respect to the same input value by an amount according to the set value, and performs the gamma correction according to the modified gamma characteristic.

In contrast, the gamma corrector 112 for reading, with the set value of the lightness-adjustment-value of a copy image output being apart from the standard lightness value in the minus direction allowing the copy image output to become darker (increased in image density) than the standard, performs for the captured-image data the gamma correction according to the gamma characteristic originally defined to achieve the standard lightness value, irrespective of the magnitude of the set value.

As schematically illustrated in FIG. 3B in block diagram, to achieve the above processing, the multi-function apparatus 1 employs a computer 200 incorporating a main CPU 202, a memory 204, and a bus 206 connecting these. The memory 204 includes a ROM 210 and a RAM 212. The ROM 210 has stored therein programs including a control program and an image processing program, a plurality of data indicative of a factor k, a factor k', a function f(x), a function g(x), etc., each of which will be described later.

FIG. 4 is a graph for explaining how the gamma characteristic is modified through the gamma correction by the gamma corrector 112 for reading.

In the graph of FIG. 4, the input value "x" of the gamma characteristic is represented on the horizontal axis, while the output value "y" is represented on the vertical axis. Each of these values, although is "255" at the maximum for 8-bit image data, is scaled into the range of 0-1 through normalization. The gamma curve depicted in solid line is a standard gamma curve for use in achieving the standard lightness value.

The standard gamma curve is defined by a function "y=f(x)" representing a relationship between the input value "x" and the output value "y," and the gamma corrector 112 for reading performs the gamma correction using the function "y=f(x)" through the execution of the related portion of the image processing program (a step S13 shown in FIG. 7) as described later in greater detail.

Therefore, the gamma corrector 112 for reading, if the set value of the lightness value for a copy image output is equal to or lower (darker) than the standard lightness value, converts the input value "x" represented by the image data inputted from the shading corrector 110, into the corresponding output value "y," by the application of the function "y=f(x)" to the input value "x."

By contrast, the gamma corrector 112 for reading, if the set value of the lightness value for a copy image output is higher (brighter) than the standard lightness value, divides the input value "x" represented by the image data inputted from the shading corrector 110, by the factor k ($0 < k < 1$) having a value corresponding to the set value, to thereby compensate the input value "x" into "x/k." The gamma corrector 112 for reading converts the compensated input value "x/k" into the corresponding output value "y," by the application of the function "y=f(x)" to the compensated input value "x/k," i.e., by the calculation of "y=f(x/k)."

A correspondence between a plurality of possible discrete values of the lightness and a plurality of possible values of the factor k is predefined, with the plurality of possible discrete values of the lightness including the standard lightness value and other values apart from the standard lightness value in the plus direction. The predefined correspondence has been previously stored in the memory 20 (e.g., the ROM 210) together with the gamma curve (i.e., f(x)) used for the gamma corrector 112 for reading.

In response to the initiation of the multi-function apparatus 1 and each event of updating the set value of the lightness value, the corresponding value of the factor k and the gamma curve (i.e., f(x)) are delivered from the controller 13 to the gamma corrector 112 for reading.

It is added that, although the input value "x" is compensated by dividing its original by the factor k ($0 < k < 1$) thereby increasing the input value "x" apparently, the present invention may be practiced in an alternative embodiment that the range (0-to-1.0) of the possible input value "x" of the gamma characteristic is multiplied by the factor k($0 < k < 1$), to thereby directly compress the range of the input value "x."

It is further added that, the present embodiment and the above alternative embodiment provide the same computational results when practiced. However, the present embodiment requires the calculation such as the above division of the input value "x" each cycle of the above compensation of the input value "x," while the alternative embodiment does not require a relatively complex calculation such as the division of the input value "x," owing to the preparation and storage of a plurality of gamma characteristic curves (gamma functions) to be resultantly selectively employed for the compensation of the input value "x." The latter means that the compression of the range of the input value "x" in the alternative embodiment easily reduces the computational complexity in performing the compensation of the input value "x."

Referring back to FIG. 4, there are depicted in graph the three gamma curves different in scale of the input value "x" for illustrative purposes for both the present embodiment and the above alternative embodiment. These three gamma curves are equivalent to representative three of a plurality of apparent or virtual functions f(x) created by applying the single real function f(x) to the actual value of the compensated input value "x/k." These three gamma curves are also equivalent to representative three of the above plurality of real gamma functions selectively employed in the alternative embodiment.

More specifically, FIG. 4 illustrates that, as the factor k decreases, the input value "x" to be mapped onto the same output value "y" decreases when viewed along the regular horizontal axis (for k=1). The three gamma curves in FIG. 4 are assigned respective three different-scaled horizontal axes, whereby these three gamma curves are superposed with one another, with the scale of the output value "y" being shared.

Therefore, the three gamma curves are together associated in terms of their respective unique horizontal axes scaled by the respective factors k. Each gamma curve is specified by the corresponding horizontal axis whose scale is calculated by multiplying the original input value "x" by the factor k.

For illustrative purposes for the present embodiment, the input value "x," when the factor k is lower than "1," is conceptually multiplied by the factor k thereby compressing the scale of the input value "x." FIG. 4 illustrates, in addition to the regular scale of the input value "x" for k=1.0, two additional scales of the input value "x" for k=0.8 and k=0.6, respectively. FIG. 4 further illustrates the corresponding two gamma characteristic curves depicted in dash-dot line (for k=0.8) and dash-dot-dot line (for k=0.6), respectively, for explaining how the gamma characteristic curve is changed with the factor k, i.e., the scale of the input value "x."

The graphs of FIG. 4 demonstrate that, the smaller the factor k, the larger the amount of compression of the scale of the input value "x," and that the gamma characteristic is modified accordingly, such that the smaller the factor k, the larger the increase of the output value "y" for K<1 from the output value "y" for k=1 (for the standard lightness value), both corresponding to the same input value "x."

Both in the present embodiment and the alternative embodiment, the factor k is defined as a variable which decreases in a given proportion as the set value of the lightness value increases from the standard lightness value in the plus direction (allowing a copy image output to be brightened) step by step.

In the example illustrated in FIG. 2 where the lightness value is adjustable in five steps in the plus direction, the factor k is changed such that the factor k is "1.0" for the standard lightness value, and such that the factor k is successively decreased to "0.9," "0.8,", . . . , "0.5," as the set value of the lightness value increases from the standard lightness value step by step.

As a result, in the case where the lightness value is set to a value which is two-step higher (brighter) than the standard lightness value, the gamma corrector 112 for reading, upon entry thereto from the controller 13 of information of the setting of the lightness value, is operated to set the factor k to 0.8 (k=0.8), compensate the scale of image data (input value "x") entered from the shading corrector 111 to "x/0.8," and convert the image data value "x" into the corresponding output value "y," by the application of the function f(x) to the compensated input value "x/0.8," i.e., by the calculation of "y=f(x/0.8)." In this case, the input value "x" is gamma-corrected according to the gamma characteristic illustrated in FIG. 4 in dash-dot line.

It is added that, in the present embodiment, the factor k is linearly changed at intervals of "0.1," as the set value of the lightness value is increased step by step. However, the present invention does not always require the linear change in the factor k, and a proportion in which the factor k is changed may be determined depending on the characteristics of multi-function apparatuses to be used.

In operation, in the present embodiment, upon a setting of the lightness value to a value apart from the standard lightness value in the plus direction, the input value "x," before application thereto of the single real function f(x), is compensated by dividing it by the predetermined factor k smaller than "1."

As a result, a combination of the compensated input value "x/k" and the single real function f(x) adapted in the present embodiment is equivalent to a plurality of gamma characteristics (six gamma characteristics, for the example illustrated in FIG. 2) which are previously prepared and selectively employed according to the set value of the lightness value.

Therefore, the present invention may be alternatively practiced in a mode that there are provided a plurality of conversion tables to be each looked up for converting the input value "x" into the corresponding output value "y" according to a corresponding one of the six gamma characteristics, and that these six gamma characteristics are selectively employed depending on the set value of the lightness value.

In the present embodiment, as described above, there are provided a calculation program for applying the function y=f(x) to the input value "x" thereby converting it to the corresponding output value "y," and a look-up table for determining a corresponding value of the factor k to the set value of the lightness value. Therefore, as compared with when the present invention is practiced in a mode that a plurality of input-to-output conversion tables corresponding to a plurality of gamma characteristics are provided, the present embodiment is more advantageous in reducing a memory size of the computer 200 for storage.

More specifically, the above mode employing the plurality of input-to-output conversion tables, when practiced, suffers from a drawback that the larger the total number of the lightness values which the user can select, the larger the total number of the input-to-output conversion tables required, and therefore, the memory size is required to be increased accordingly.

In contrast, in the present embodiment in which the single function y=f(x) is applied to the input value "x" after the input value "x" is processed with the factor k, even though there is increased the total number of the lightness value which the user can select, all that is increased is the number of the factors k, and it neither adversely affect the memory size required for executing the calculation program for applying the function y=f (x) to the input value "x," nor require any modification to the calculation program.

Referring back to FIG. 2, the color converter 113 is for use in converting the additive-color-based sets of image data indicative of R, G, and B color components, upon gamma-corrected, into the subtractive-color-based sets of image data indicative of C, M, and Y color components. The color converter 113 calculates using the following equations, to thereby convert the additive-color-based sets of image data indicative of R, G, and B color components, into the subtractive-color-based sets of image data indicative of C, M, and Y color components:

$$VC = (1 - VR/VR\max) \quad (1)$$

$$VM = (1 - VG/VG\max) \quad (2)$$

$$VY = (1 - VB/VB\max) \quad (3)$$

where:

VC, VM, VY: scaled or normalized density (tone) levels of subtractive three primary colors, respectively, VR, VG, VB: input density (tone) levels of additive three primary colors, respectively, and VRmax, VGmax, VBmax: maximum density (tone) levels of sets of image data of R, G, and B colors, respectively.

For example, for the image data in an 8-bit format, maximum density levels VRmax, VGmax, VBmax are each "255," and therefore, sets of image data indicative of C, M, and Y color components are calculated by:

$$VC = (1 - VR/255);$$

$$VM = (1 - VG/255); \text{ and}$$

$$VY = (1 - VB/255), \text{ respectively.}$$

The UCR processor 114, as described above, is adapted to produce the image data indicative of a K color component, based on the minimum one of values represented by three sets of image data indicative of C, M, and Y color components, respectively. The UCR processor 114 is further adapted to modify the three sets of image data indicative of C, M, and Y color components, respectively, using the produced image data indicative of a K color component, to thereby produce final image data for recording More specifically, the UCR processor 114 is adapted to employ a compensation characteristic for determining the value of a K color component, which is illustrated in graph in FIG. 5 as a relationship in level between the input value and the output value. The UCR processor 114 selects the minimum one of the values of sets of image data indicative of C, M, and Y color components, as the input value, and calculates the output value from the selected input value according to the compensation characteristic, to thereby produce image data indicative of a K color component having the calculated output value.

Figure 5:
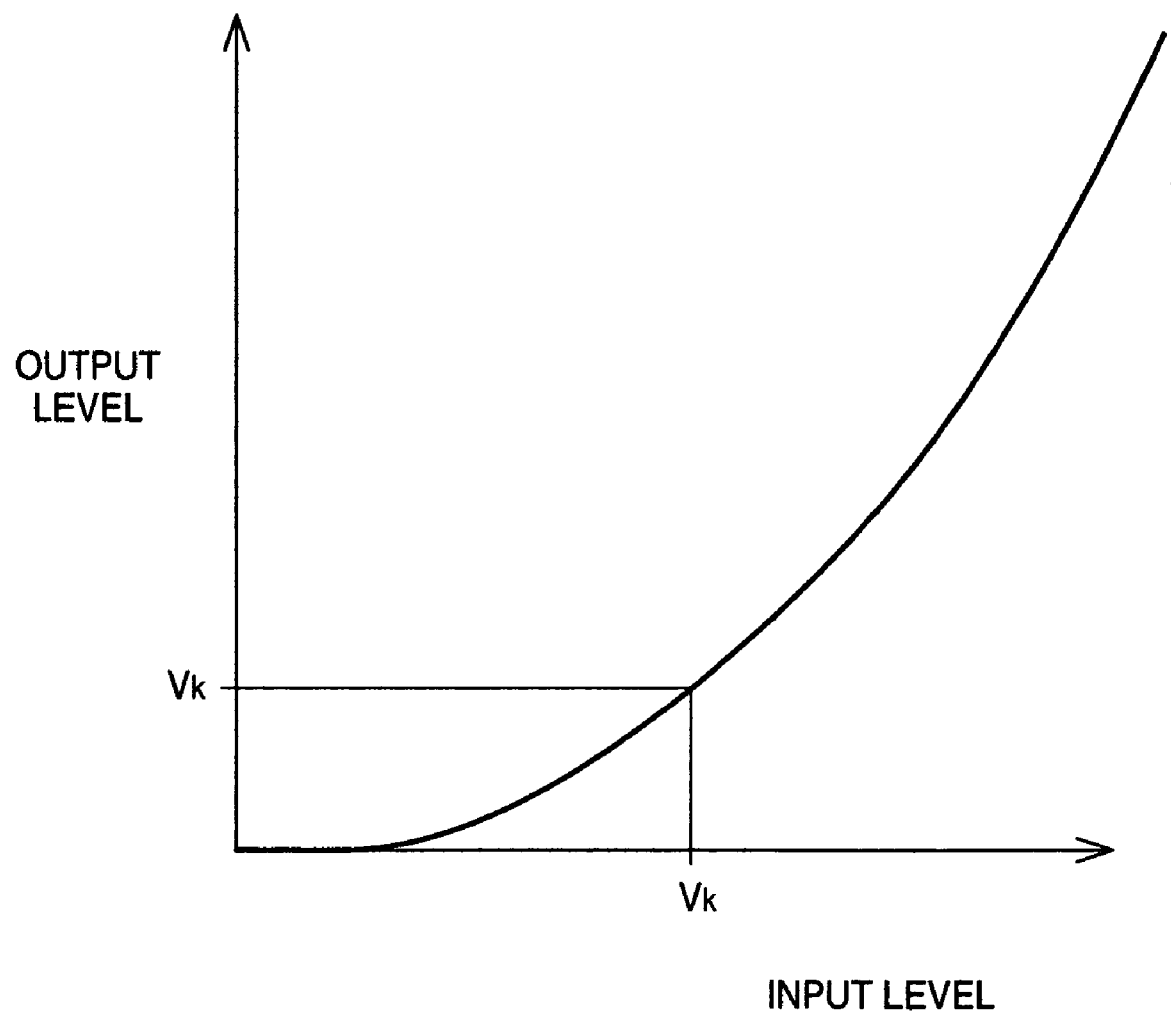
FIG. 5 is a graph illustrating an example of a value conversion characteristic for use in determining the value of image data of a K color component at a UCR processor illustrated FIG. 3A.

As illustrated in FIG. 5, in this example, the output value VK is kept as "0" until the input value VK reaches a predetermined value.

For example, if the minimum one of the values represented by sets of image data indicative of C, M, and Y color components, is the value VC represented by the image data indicative of a C color component, the value VC is selected as the input value of the compensation characteristic. Then, the corresponding output value VK of a K color component is calculated according to the compensation characteristic, and the image data indicative of a K color component having the calculated output value VK is produced.

In addition, the UCR processor 114 subtracts the same amount as the output value VK from each of sets of image data indicative of C, M, and Y color components, to thereby produce each of sets of final image data indicative of C, M, and Y color components for recording. As a result, the values represented by the corresponding sets of image data indicative of C, M, and Y color components become "(VC-VK)," "(VM-VK)," and "(VY-VK)," respectively.

The gamma corrector 115 for recording is adapted to perform a gamma correction for image data for recording indicative of C, M, Y, and K color components. The gamma corrector 115 for recording employs a plurality of gamma characteristics for respective C, M, Y, and K color components.

In operation, once the lightness value of a copy image output is set to a value apart from the standard lightness value in the minus direction (allowing the copy image output to be darkened, i.e., increased in image density), the gamma corrector 115 for recording modifies each of the plurality of gamma characteristics so as to allow the output value to be increased with respect to the same input value, depending on the set value of the lightness value, and then, gamma-corrects the image data UCR-corrected, according to the modified gamma characteristic.

Alternatively, once the lightness value of a copy image output is set to a value apart form the standard lightness value in the plus direction (allowing the copy image output to be brightened), the gamma corrector 115 for recording gamma-corrects the UCR-corrected image data according to a standard gamma characteristic established for the standard lightness value, irrespective of the magnitude of the set value of the lightness value.

For the gamma corrector 115 for recording, a relationship between the gamma correction processing and the gamma characteristic is established to be basically the same as a relationship between the gamma correction processing and the gamma characteristic in the gamma corrector 112 for reading.

More specifically, in the present embodiment, similarly with the gamma corrector 112 for reading, the gamma corrector 115 for recording employs a calculation program for applying the function $y=g(x)$ to the input value "x" for calculating the corresponding output value "y." The function $y=g(x)$ defines a gamma curve between the input value "x" and the output value "y" for achieving the standard lightness value.

In operation, once the lightness value of a copy image output is set to a value equal to or higher (brighter) than the standard lightness value, the gamma corrector 115 for recording applies the function $y=g(x)$ to the input value "x" of the image data entered from the UCR processor 114, to thereby convert the input value "x" to the corresponding output value "y."

Alternatively, once the lightness value of a copy image output is set to a value lower (darker) than the standard lightness value, the gamma corrector 115 for recording compensates the input value "x" of the image data entered from the UCR processor 114, by dividing the input value "x" by the factor k' ($0<k'<1$) corresponding to the set value of the lightness value. The gamma corrector 115 for recording applies the function $y=g(x)$ to the compensated input value "x/k'" to thereby convert the compensated input value "x/k'" into the corresponding output value "y."

In the present embodiment, as described above, the gamma corrector 115 for recording is configured to compensate the input value "x" by dividing it by the factor k' ($0<k'<1$), similarly with the gamma corrector 11 for reading. However, the gamma corrector 115 for recording may be of course alternatively practiced in a mode that, as stated in the above alternative embodiment, the range of input value "x" of the gamma curve is multiplied by the factor k' ($0<k'<1$), to thereby directly compress the range of the input value "x." This alternative mode allows reduction in the computational complexity in calculating the corresponding output value "y," consecutive to reduction in computational time, as stated in the above alternative embodiment.

A correspondence between a plurality of possible discrete values of the lightness and a plurality of possible values of the factor k' is predefined, with the plurality of possible discrete values of the lightness including the standard lightness value and other values apart from the standard lightness value in the minus darkening) direction. The predefined correspondence has been previously stored in the memory 20 (e.g., the ROM 210) together with the gamma curve (i.e., $g(x)$) used for the gamma corrector 115 for recording.

In response to the initiation of the multi-function apparatus 1 and each event of updating the set value of the lightness value, the corresponding value of the factor k' and the gamma curve (i.e., $g(x)$) are delivered from the controller 13 to the gamma corrector 115 for recording.

In the present embodiment, the factor k' is defined as a variable which decreases in a given proportion as the set value of the lightness value increases from the standard lightness value in the minus direction (allowing a copy image output to be darkened) step by step, similarly with the gamma corrector 112 for reading.

For example, in the case where the lightness value is set to a value which is two-step lower than the standard lightness value, and where the corresponding value of the factor k' is 0.7 (k'=0.7), the gamma corrector 115 for recording is operated to compensate the image data value "x" entered from the UCR processor 114, to "x/0.7," and then convert the compensated input value "x/0.7" into the corresponding output value "y," by the application to the compensated input value "x/0.7" of the function g(x), i.e., by the calculation of y=g(x/0.7).

It is added that, in the present embodiment, a proportion in which the factor k' is changed in the gamma corrector 115 for recording may be determined depending on the characteristics of multi-function apparatuses to be used, similarly with the gamma corrector 112 for reading.

The image recorder 12 is for use in forming a multi-colored image on the recording paper, based on sets of image data indicative of C, M, Y, and K color components, delivered from the gamma corrector 115 for recording. The image recorder 12 is in the form of a color printer of an inkjet type, for example.

It is added that, a color printer adapted as the image recorder 12 is not limited to an inkjet type, and any one of other types, such as an electrostatic photography type, an ink ribbon type, and a heat transfer type, may be adapted as the image recorder 12.

The image recorder 12, which is disposed movable in a direction perpendicular to a transport direction of the recording paper (hereinafter, referred to as "main scan direction"), includes a print head, a drive controller, and a recording controller.

The print head is adapted to jet or spray inks of C, M, Y, and K color components onto the recording paper. The drive controller is adapted to control the movement of the print head in the main scan direction. The recording controller is adapted to control the firing of an ink of each color component from the print head, based on a corresponding one of sets of image data indicative of C, M, Y, and K color components.

More specifically, the print head, in the cubic shape having a predetermined dimension in the width-wise direction, is provided with four nozzles jetting inks of C, M, Y, and K color components, respectively, with the four nozzles facing the recording paper. To the four nozzles, the inks are supplied from corresponding ink cartridges of C, M, Y, and K color components, respectively. For forming an image on the recording paper, the print head is oscillated in the main scan direction relative to the recording paper at a predetermined speed by the direction of the aforementioned drive controller.

In synchronization with the moving speed of the print head relative to the recording paper in the main scan direction, each ink of the corresponding color component is jetted onto the recording paper, based on a corresponding one of sets of image data indicative of C, M, Y, and K color components, resulting in the formation of one line area of the entire resulting output image. As the print head prints line by line, the recording paper is fed line by line. Repeat of a combination of the line-wise image formation by the print head and the line-wise feed of the recording paper results in the formation of an image on the entire region of the recording paper.

It is added that, for the nozzle layout in which an array of a plurality of nozzles is arranged for each color component at the print head, which allows a concurrent printing along the corresponding sub-scan lines (one band), the incremental feed of the recording paper may be modified according to the nozzle layout.

The controller 13 is configured to intensively control the operations of the image reader 10, the image processor 11, and the image recorder 12, for performing a copying operation. The controller 13 is implemented by the computer 200, mainly the main CPU 202, of the multi-function apparatus 1. As stated above, in response to the initiation of the multi-function apparatus 1 or each time the set value of the lightness value of a copy image output is changed, the controller 13, upon determining the factor k in conformity with the set value, delivers the determined factor k to the gamma corrector 112 for reading, and, upon determining the factor k' in conformity with the set value, delivers the determined factor k' to the gamma corrector 115 for recording.

The lightness adjuster 14, for use in adjusting the lightness value of a copy image output, is constructed to include a feature for allowing a lightness-adjustment-support picture (see FIG. 2) to be displayed on the display screen 2*a* of the display portion 2, and a member manipulated by the user in association with the lightness-adjustment-support picture, in the form of the cursor key 331.

In operation, once the multi-function apparatus 1 is initiated in response to the user's manipulation of a suitable operation button for a main power supply, information of the standard lightness value is entered into the controller 13 from the lightness adjuster 14.

Once the user, after causing the display portion 2 to display the lightness-adjustment-support picture, makes a modification (including a modification for return to the standard lightness value) to the set value of the lightness value as a result of the user's manipulations of the right- or left-hand key portion 331*c*, 331*d* of the cursor key 331 and the menu/set button 332, information of the modified set value of the lightness value is entered into the controller 13 from the light adjuster 14.

In response, the controller 13 determines the current values of the factors k and k' corresponding to the set value of the lightness value inputted from the lightness adjuster 14, and delivers them to the gamma corrector 112 for reading and the gamma corrector 115 for recording, respectively.

Then, there will be described below the proceedings performed in the controller 13 for the case where the set value of the lightness value of a copy image output has been updated, and the proceedings performed in the image processor 11 for the copying operation after the set value of the lightness value is updated.

Figure 6:
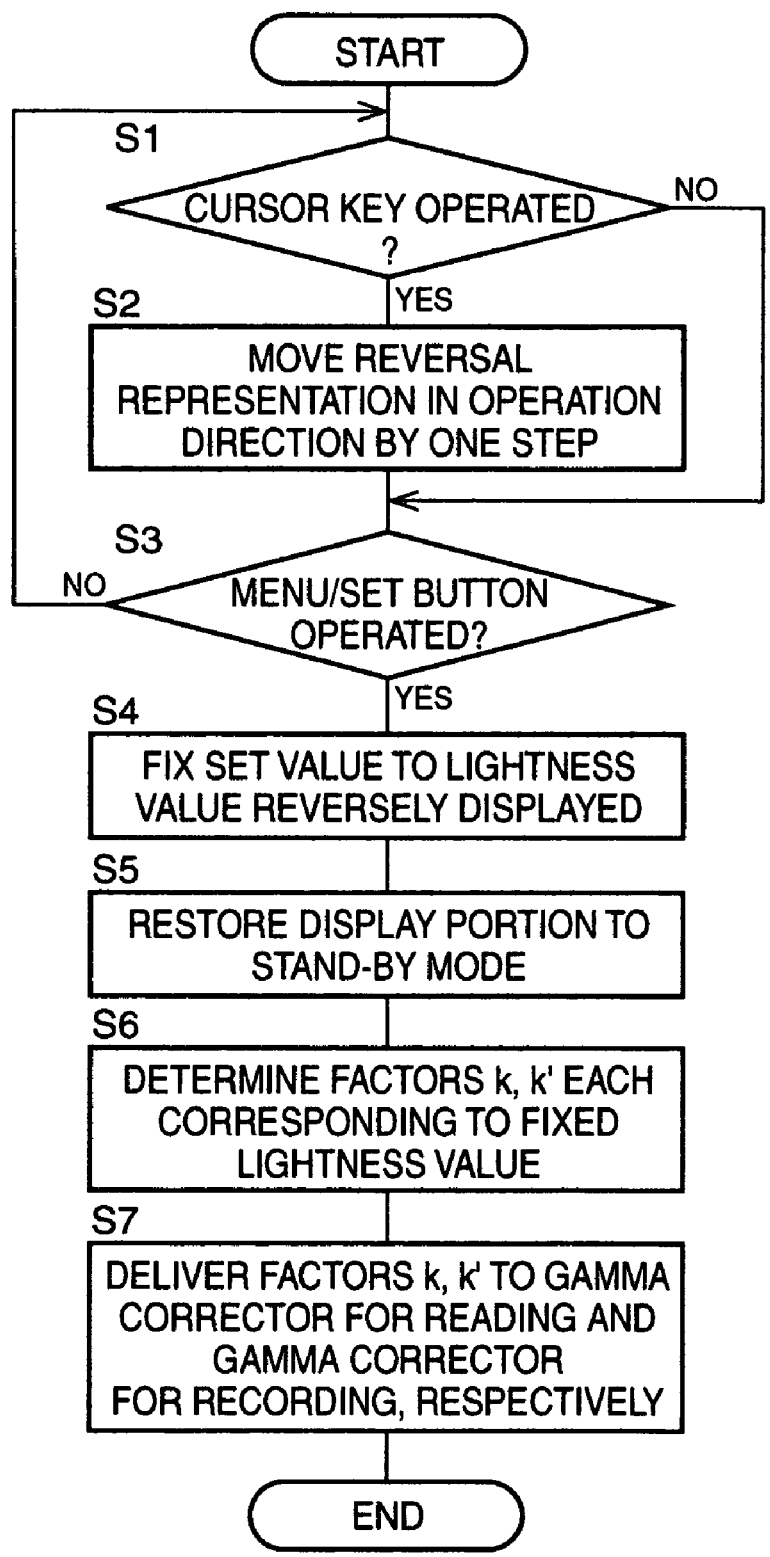
FIG. 6 is a flow chart for illustrating processing procedures implemented by a controller illustrated in FIG. 3A for adjusting a set value of the lightness of a copy image output, the flow chart being also for illustrating a control program executed by the computer illustrated in FIG. 3B.

First, the proceedings performed in the controller 13 for the case where the set value of the lightness value of a copy image output has been updated will be described with reference to FIG. 6 illustrating in flow chart the proceedings in the name of the control program. FIG. 6 illustrates the proceedings performed in the controller 13 with the lightness-adjustment-support picture being displayed on the display portion 2.

Upon display of the lightness-adjustment-support picture (see FIG. 2) on the display portion 2, the execution of the control program of FIG. 6 by the computer 200 is initiated with a step S1. The step S1 is implemented to determine whether or not the user has operated the cursor key 331 at its right- or left-hand key portion 331*c*, 331*d*. If the user has not operated the cursor key 331, then the determination of the step S1 becomes negative "NO," and the execution proceeds to a step S3 to determine whether or not the user has operated the menu/set button 332.

If the user has operated neither the cursor key 331 nor the menu/set button 332, then the determinations of the steps S1 and S3 both become negative "NO," and the execution loops back to the step S1 and enters a stand-by state in which a stand-by picture is displayed on the display portion 2.

The loop of the steps S1 and S3 is repeated until the user has operated any one of the cursor key 331 and the menu/set button 332.

If the user has operated the cursor key 331 at any one of the right- and left-hand key portions 331*c*, 331*d*, then the determination of the step S1 becomes affirmative "YES," and the execution proceeds to a step S2. The step S2 is implemented to cause the display portion 2 to display the lightness-adjustment-support picture such that one of the plurality of lightness-value-markings 8*a*, 8*b*, 8*c* which is distinctly displayed in reverse (in black color) is moved, by only one step, in one of the plus and minus directions corresponding to one of the right- and left-hand key portions 331c, 331d which the user has operated.

In the example illustrated in FIG. 2, if the user operates the cursor key 331 at the left-hand key portion 331c, then the reversal representation is moved in position leftward, resulting in one of the plurality of lightness-value markings 8c on the left of the original reversal representation being reversely displayed.

Alternatively, if the user operates the cursor key 331 at the right-hand key portion 331d, then the reversal representation is moved in position rightward, resulting in one of the plurality of lightness-value markings 8b on the right of the original reversal representation being reversely displayed.

Thereafter, the step S3 is implemented to determine whether or not the user has operated the menu/set button 332. If not, then the determination of the step S3 becomes negative "NO," and the execution returns to the step S1 to determine whether or not the user has operated the cursor key 331.

During the repeated implementation of the loop of the step S1 and S3, if the user successively operates the cursor key 331, then the step S2 is also successively implemented to move one of the plurality of lightness-value markings 8a, 8b, 8c which has been reversely displayed, by one step, in the direction matching the user's selective manipulation of the right- or left-hand key portion 331c, 331d, each time that the user operates the cursor key 331.

If the user, because the reversal representation in the lightness-adjustment-support picture has brought into a match with the user's desired value of the lightness value of a copy image output, operates the menu/set button 332, then the determination of the step S3 becomes affirmative "YES," and the execution proceeds to a step S4 to fix the lightness value of the copy image output to the value indicated by the position of the reversal representation.

In the example illustrated in FIG. 2, if the user operates the menu/set button 332, with one of the plurality of lightness-value markings 8b which is disposed plus two-step apart from the lightness-value marking 8a indicating the standard lightness value being reversely displayed, then the lightness value is set to a value two-step brighter than the standard lightness value.

Thereafter, a step S5 is implemented to return the display portion 2 to a state in which the aforementioned stand-by picture is displayed. The step S5 is followed by a step S6 to determine the values of the factors k and k' so as to reflect the fixed set value of the lightness value.

Subsequently, a step S7 is implemented to deliver the determined factor k to the gamma corrector 112 for reading, and to deliver the determined factor k' to the gamma corrector 115 for recording.

Then, one cycle of the execution of the control program is terminated, resulting in termination of one cycle of the proceedings for the lightness adjustment.

As a result, if the user wishes a copy image output to be formed brighter, the factors k and k' are established such that the factor k (0<k<1) conforms with the user's set value of the lightness value, while the factor k' is 1.0 (k'=1.0). Alternatively, if the user wishes a copy image output to be formed darker (with the image density being increased), the factors k and k' are established such that the factor k is 1.0 (k=1.0), while the factor k' (0<k'<1.0) conforms with the user's set value of the lightness value.

Figure 7:
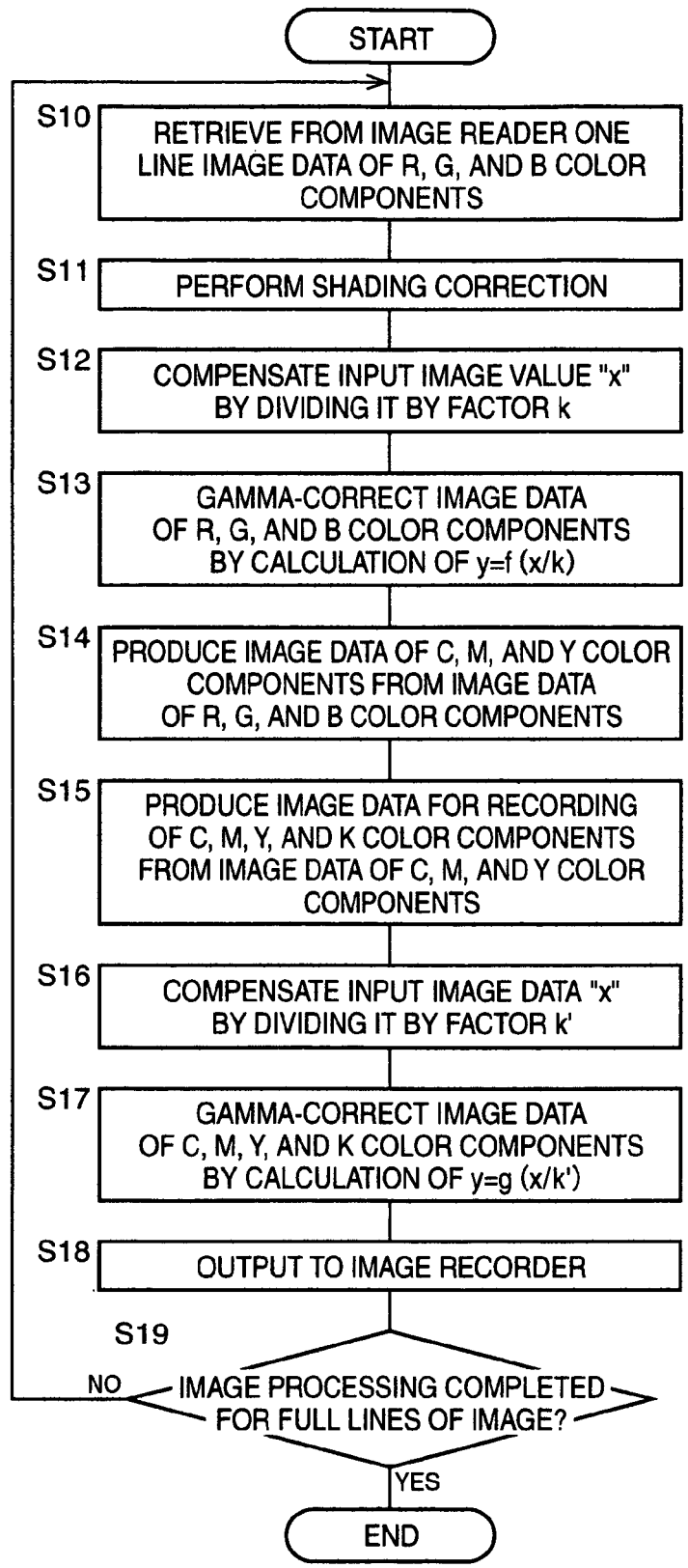
FIG. 7 is a flow chart for illustrating processing procedures implemented by an image processor illustrated in FIG. 3A after adjusting the set value of the lightness of the copy image output, the flow chart being also for illustrating an image processing program executed by the computer illustrated in FIG. 3B.

Next, the proceedings performed in the image processor 11 for the copying operation after the set value of the lightness value has been updated will be described with reference to FIG. 7 illustrating in flow chart the proceedings in the name of the image processing program.

Once the image reader 10 reads the image of an original document, the execution of the image processing program by the computer 200 is initiated with a step S10. The step S10 is implemented to retrieve from the image reader 10, sets of image data indicative of R, G, and B color components (hereinafter, collectively referred simply as "per-color sets of image data"), and to deliver the sets of image data to the image processor 11.

The step S10 is followed by a step S11 to instruct the shading corrector 111 to shading-correct the retrieved per-color sets of image data. Thereafter, a step S12 is implemented to instruct the gamma corrector 112 for reading to gamma-correct the shading-corrected image data.

More specifically, for each of R, G, and B color components, the corresponding image data value (input value) "x" is divided by the factor k into "x/k," and the input value "x/k" is converted into the corresponding output value "y," by the calculation of the corresponding gamma function f(x/k).

It is added that, in the case where the user wishes to darken a copy image output, the factor k is set to 1.0 (k=1.0) and therefore the gamma correction is made for achieving the standard lightness value.

Thereafter, a step S14 is implemented to instruct the color converter 113 to produce sets of image data indicative of C, M, and Y color components, using corresponding sets of gamma-corrected image data indicative of R, G, and B color components.

The step S14 is followed by a step S15 to instruct the UCR processor 114 to produce, from the produced sets of image data indicative of C, M, and Y color components, sets of image data, for recording, indicative of C, M, Y, and K color components.

Subsequently, a step S16 is implemented to divide the image data value "x" by the factor k', to thereby convert the original input value "x" into the compensated input value "x/k'." The step S16 is followed by a step S17 to convert the compensated input value "x/k'" into the corresponding output value "y," by the calculation of the corresponding gamma function g(x/k'). Subsequently, a step S18 is implemented to output to the image recorder 12 the gamma-corrected sets of image data indicative of C, M, Y, and K color components, resulting in the formation of an image on the recording paper at the image recorder 12.

Thereafter, a step S19 is implemented to determine whether or not the above image processing has been completed for the full lines (sub-scan lines) of the image. If not, then the determination of the step S19 becomes negative "NO," and the execution returns to the step S10, resulting in the following steps S10 to S18 being implemented to perform the above image processing for the next subsequent line of the image.

As a result of the above implementation, sets of image data, for use in recording, indicative of C, M, Y, and K color components are produced per line of the image. The produced sets of image data are delivered to the image recorder 12 to form the image on the recording paper.

If the full-line image has been formed, then the determination of the step S19 becomes affirmative "YES," and one cycle of the execution of the image processing program of FIG. 7 is terminated, and therefore a series of image processing operations is also terminated.

As described above, the multi-function apparatus 1 according to the present embodiment is configured to perform the lightness adjustment for a copy image output in such a manner, in response to a request for adjusting the lightness value to a set value apart from the standard lightness value in the darkening direction, that the gamma correction characteristics for sets of shading-corrected image data indicative of R, G, and B color components are each fixed to that in conformity with the standard lightness value, and that the gamma correction characteristics employed for the sets of image data which are produced by the UCR processor 114 for use in recording, and which are indicative of C, M, Y, and K color components are each modified to that in conformity with the set value of the lightness value.

As a result, the multi-function apparatus 1 allows, upon a request from the user to darken an copy image output, increase in density of the copy image output, not by decreasing the lightness, but by increasing the saturation.

FIGS. 8(a)-8(e) illustrate in graph an example of color balances of per-color image data values outputted from each stage of the image processor 11, in the case where the lightness value of a copy image output is requested to be adjusted to a set value apart from the standard lightness value in the darkening direction (i.e., a direction to increase the image density).

In FIGS. 8(a)-8(e), each per-color image data value (each color value or level) is represented after normalization in which a maximum value ("255" for 8-bit data, for example) of the original image data value is scaled into "1.0."

More specifically, FIG. 8(a) illustrates sets of image data indicative of R, G, and B color components entered into the gamma corrector 112 for reading. FIG. 8(b) illustrates sets of image data indicative of R, G, and B color components outputted from the gamma corrector 112 for reading. FIG. 8(c) illustrates sets of image data indicative of C, M, and Y color components outputted from the color converter 113. FIG. 8(d) illustrates sets of image data indicative of C, M, Y, and K color components outputted from the UCR processor 114. FIG. 8(e) illustrates sets of image data indicative of C, M, Y, and K color components outputted from the gamma corrector 115 for recording.

Figure 13:
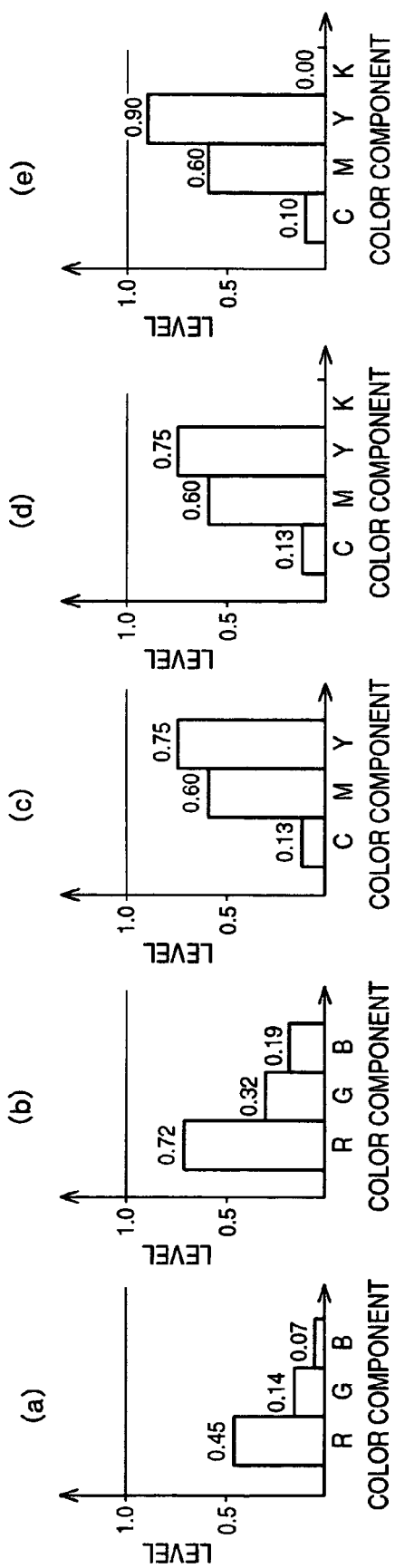
FIG. 13 is a set of graphs illustrating an example of image data of C, M, Y, and K color components produced by the UCR processor illustrated in FIG. 10, in the case where image data indicative of a darker portion of an entire image has been gamma-corrected by a first gamma corrector illustrated in FIG. 10 so as to achieve a standard lightness value.
Figure 14:
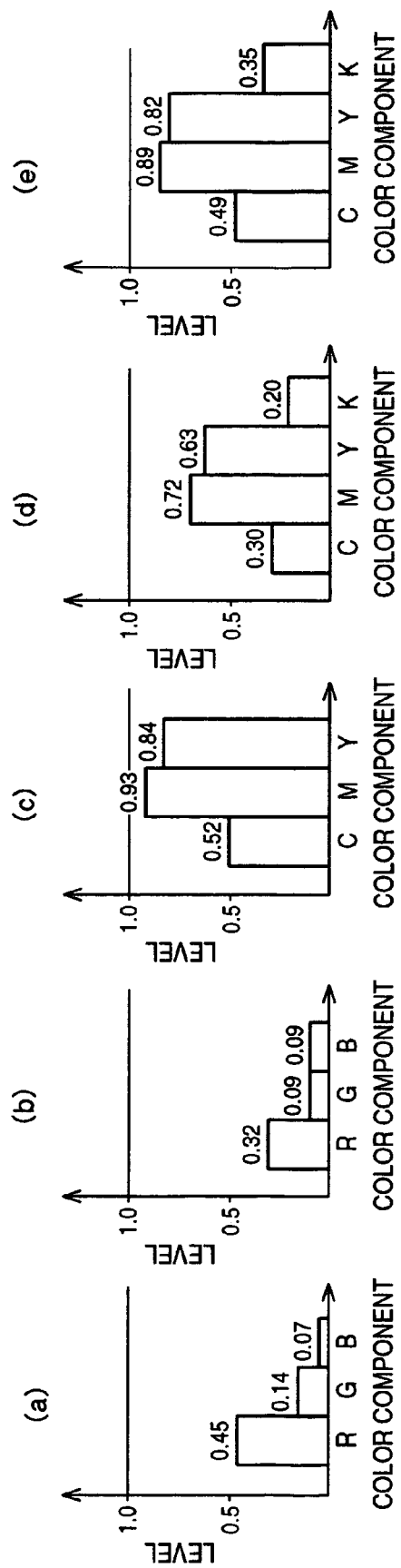
FIG. 14 is a set of graphs illustrating an example of image data of C, M, Y, and K color components produced by the UCR processor illustrated in FIG. 10, in the case where image data indicative of a darker portion of an entire image has been gamma-corrected by the first gamma corrector of FIG. 10 so as to achieve a lightness value lower than the standard lightness value.
Figure 15:
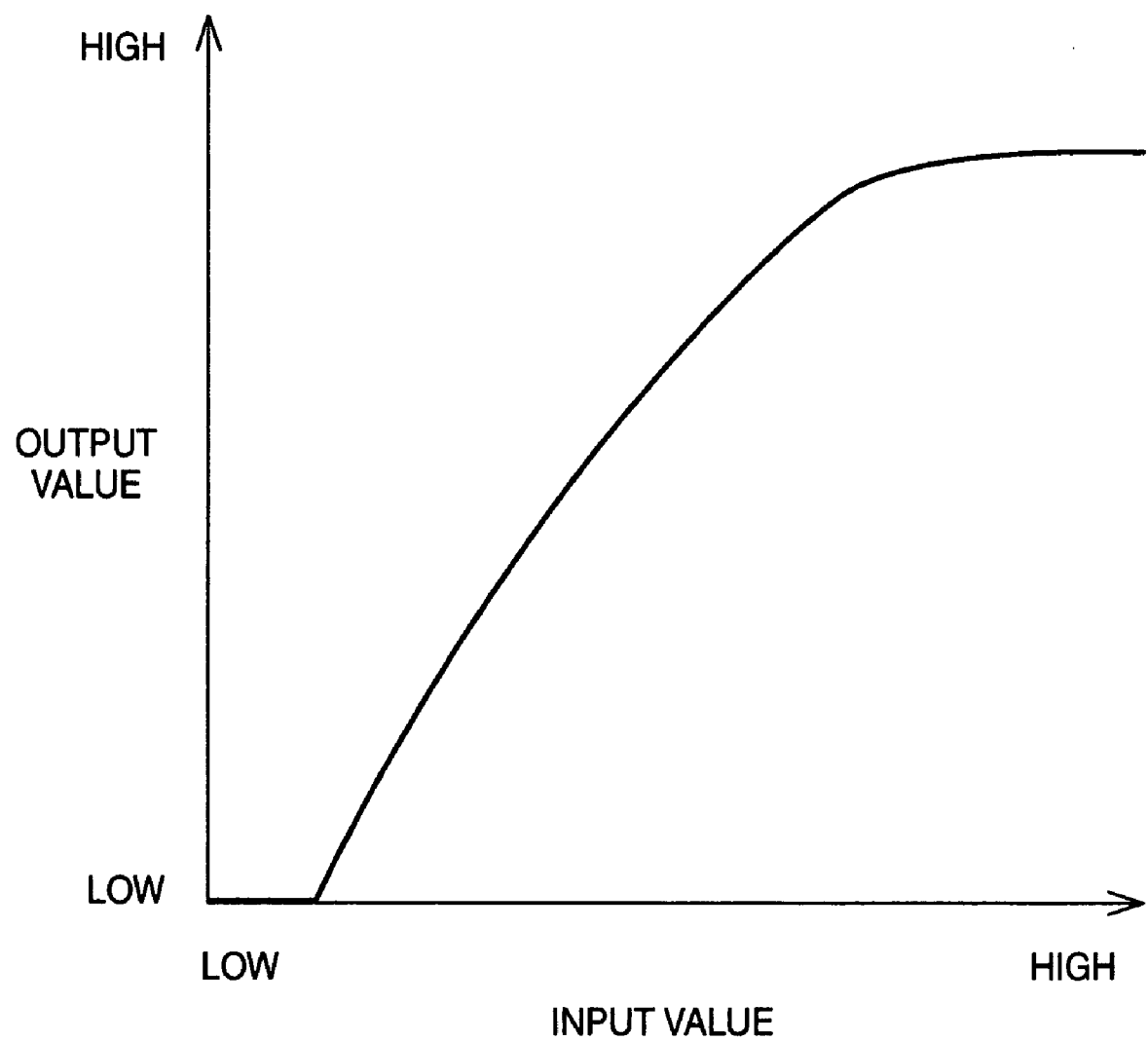
FIG. 15 is a graph illustrating an example of a first gamma-characteristic-curve selected in the first gamma corrector of FIG. 10, in the case where the standard lightness value is requested.
Figure 16:
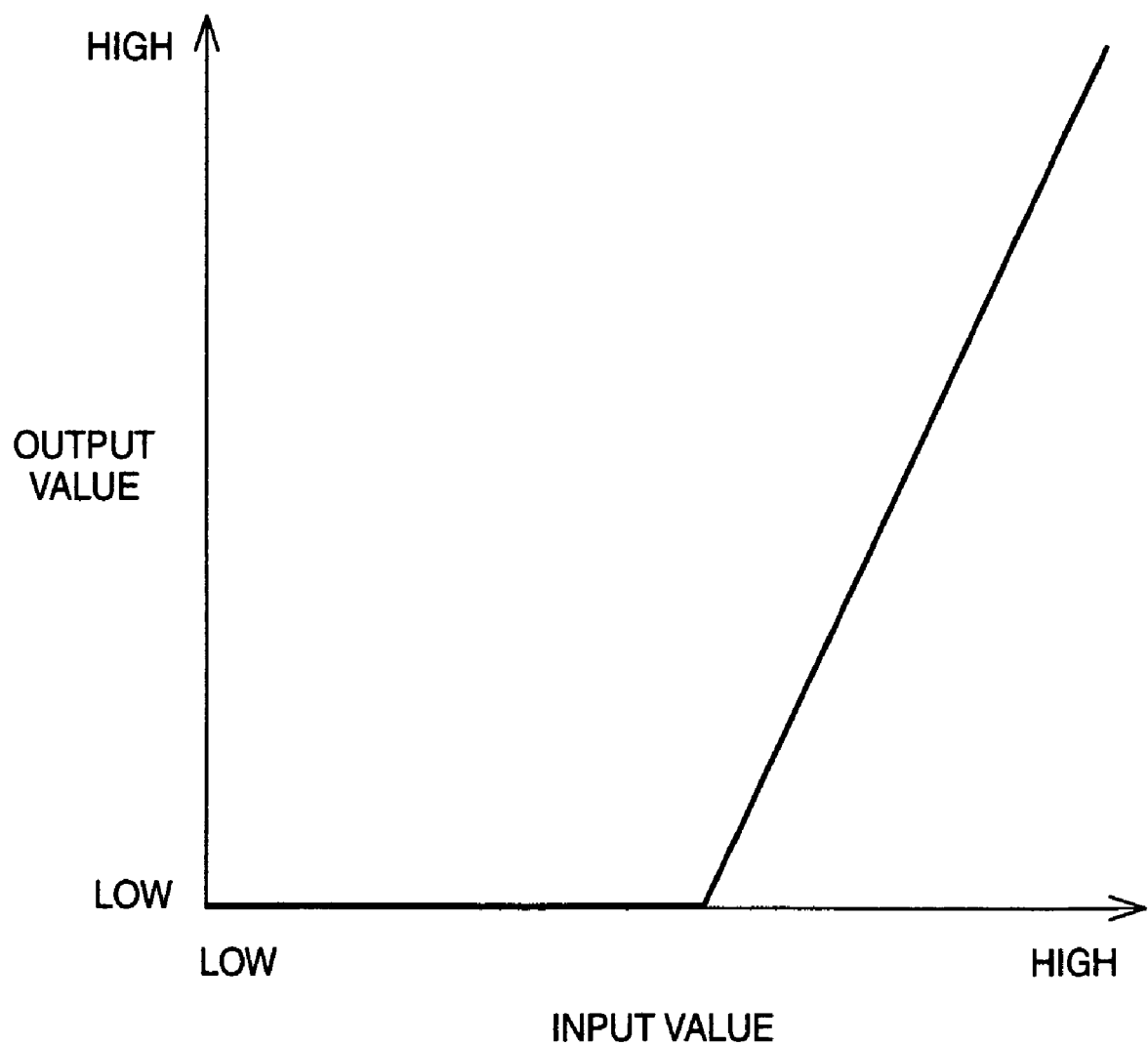
FIG. 16 is a graph illustrating an example of a UCR characteristic curve selected in the UCR processor of FIG. 10, in the case where the standard lightness value is requested.
Figure 17:
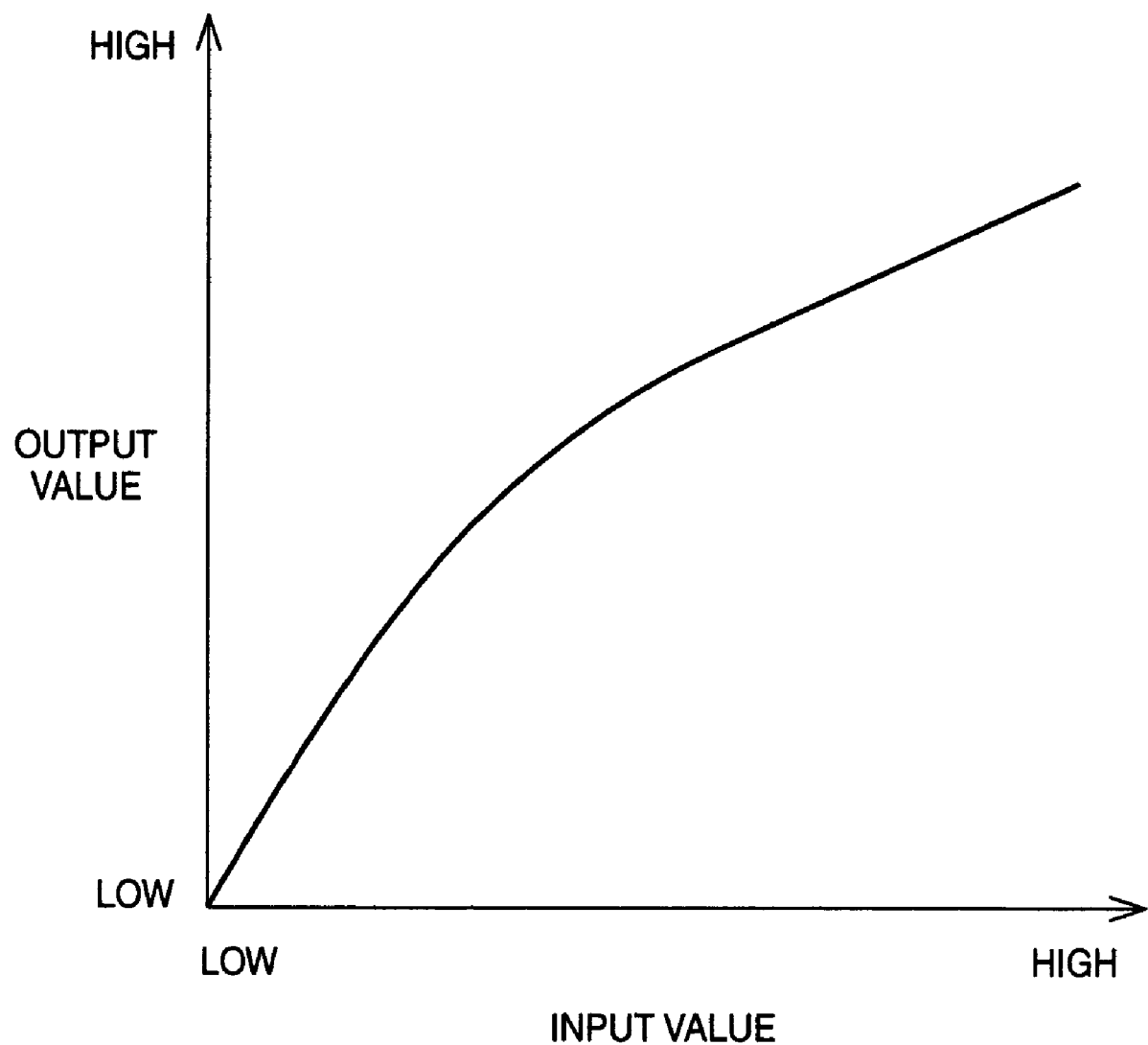
FIG. 17 is a graph illustrating an example of a second gamma-characteristic-curve selected in the second gamma corrector of FIG. 10, in the case where the standard lightness value is requested.

In the example illustrated in FIGS. 8(a)-8(e), image data values indicative of R, G, and B color components entered into the gamma corrector 112 for reading are made to be the same as those in the examples illustrated in FIGS. 13 and 14, respectively, for the convenience of comparative description. The representations of FIGS. 8(a)-8(e) correspond to those of FIGS. 13(a)-13(e), respectively, and correspond to those of FIGS. 14(a)-14(e), respectively.

In the present embodiment, once the lightness value of a copy image output is requested to be adjusted to a set value apart from the standard lightness value in the darkening direction (i.e., a direction to increase the image density), the content of the request is reflected to only the factor k' used in the gamma corrector 115 for recording, while the content of the request does not affect the gamma corrector 112 for reading.

Figure 8:
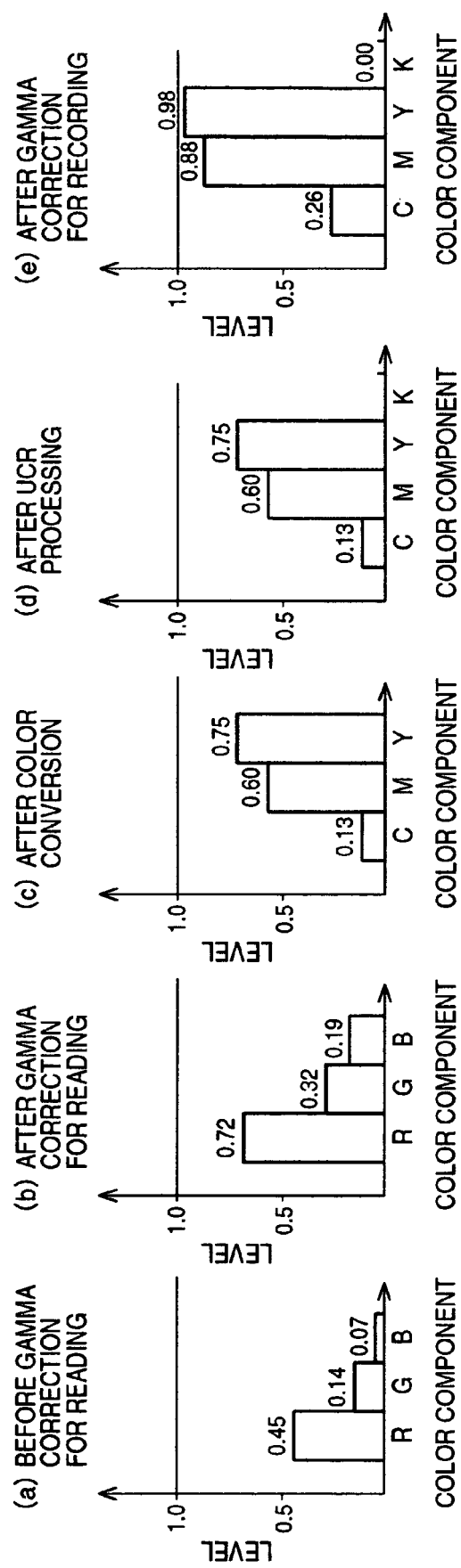
FIG. 8 is a set of graphs illustrating an example of a color balance represented by image data outputted from each stage of the image processor illustrated in FIG. 3A, in the case where the lightness value of a copy image output is requested for adjustment for forming the copy image output with the lightness being lower (darker) than a standard lightness value.

As a result, FIGS. 8 (a)-(d) illustrating the image data values outputted from the stages of the image processor 11 excepting the final stage are common in content with FIGS. 13(a)-13(d), while only FIG. 8(e) illustrating the image data values outputted from the final stage of the image processor 11 is different in content from FIG. 13(e).

In the present embodiment, the gamma characteristic used in the gamma corrector 115 for recording is modified such that the output value becomes higher than that conforming with the standard lightness value according to the gamma characteristic, with respect to the same input value.

Therefore, as will be evident from the comparison in content between FIG. 8(e) and FIG. 13(e), the image data values indicative of C, M, Y, and K color components outputted from the gamma corrector 115 for recording are higher, over the entire of the color components, than when the lightness value of a copy image output is set to the standard lightness value.

In addition, in the example illustrated in FIGS. 8(a)-(e), the color value of a C color component, which is the minimum of the color values of C, M, and Y color components, does not reach a predetermined value allowing the UCR processor 114 to produce a K color component. As a result, the entire image data for recording is formed to include only C, M, and Y color component image data, not including K color component image data.

Therefore, even if the gamma corrector 115 for recording performs the gamma correction for increasing (increasing in image density) the output value over the entire region, there is no chance for the resulting image to contain a K color component.

Figure 9:
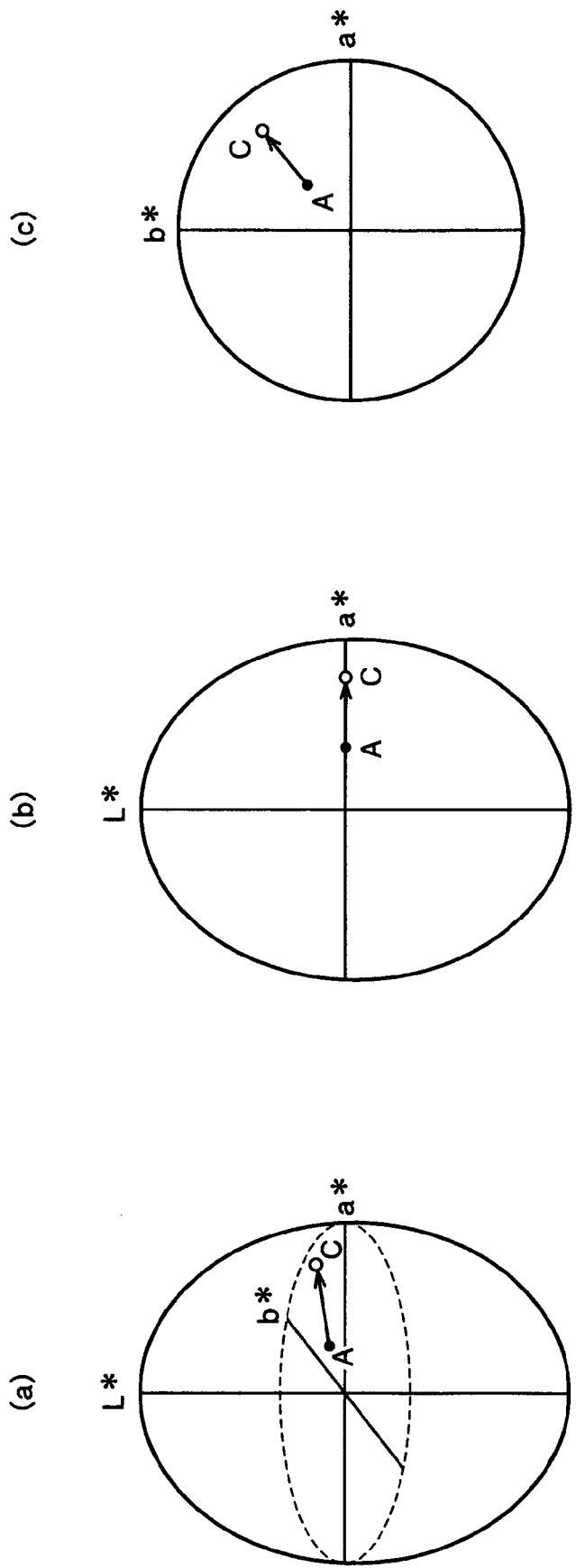
FIG. 9 is a set of graphs for explaining in terms of an L*a*b* color space how a color is changed in response to the lightness adjustment in which a copy image output is darkened according to a lightness adjustment method implemented in the embodiment of the present invention.
Figure 10:
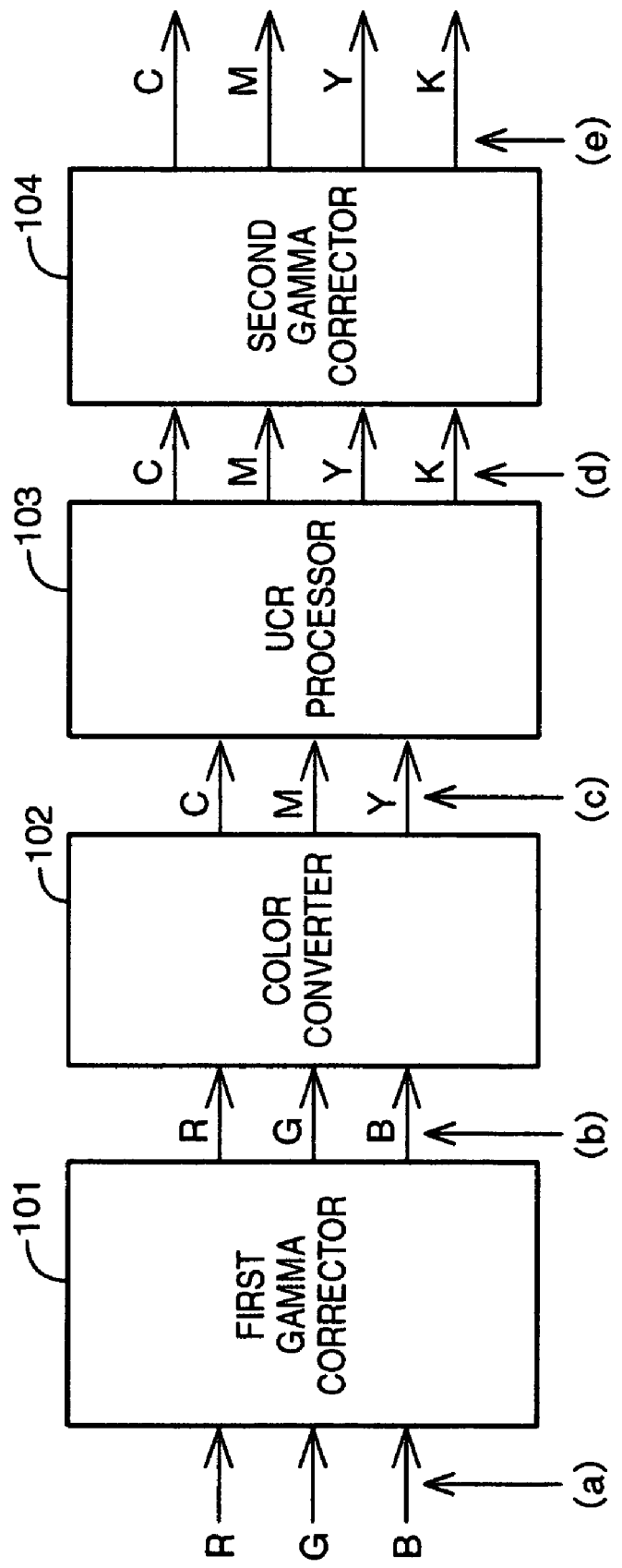
FIG. 10 is a block diagram schematically illustrating an image processor of an example of a conventional image forming apparatus.
Figure 11:
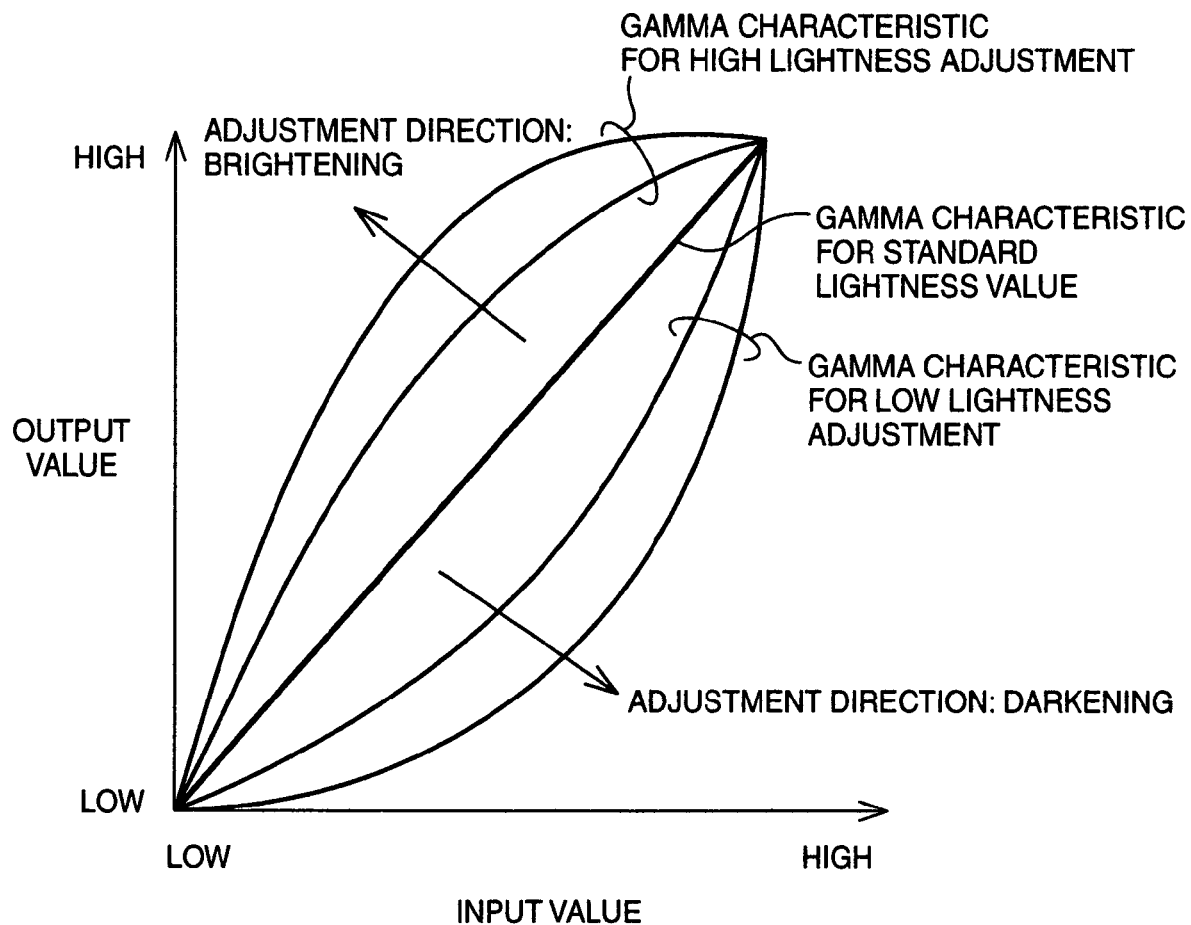
FIG. 11 is a graph for explaining a gamma characteristic variable depending on a lightness value set using a lightness-adjustment key of the conventional image forming apparatus.
Figure 12:
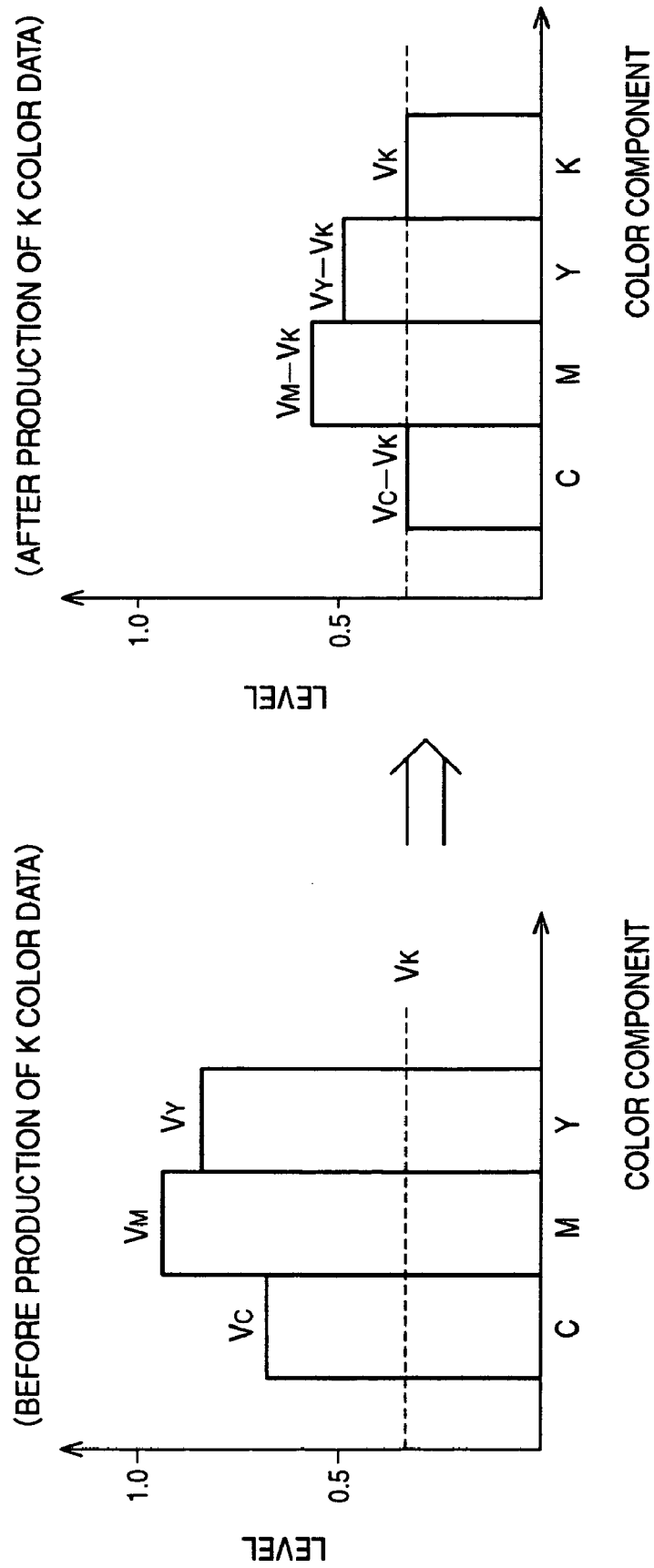
FIG. 12 is a set of graphs for explaining how UCR processors of FIGS. 3A and 10 each produce data of C, M, Y, and K color components.

FIGS. 9(a)-9(c) are views in terms of an L*a*b* color space, for easily understanding how a color is changed from position A to position C, upon conversion of the color according to a first gamma characteristic curve. More specifically, FIG. 9(a) is a perspective view illustrating the L*a*b* color space, FIG. 9(b) is a plan view of an L*a* color plane, and FIG. 9(c) is a plan view of an a*b* color plane.

FIGS. 9(a)-9(c) demonstrates that, a user's manipulation via the cursor key 331 for color-correcting a copy output image in the darkening direction does not cause a color correction in which the lightness value "L" is decreased in the L*a*b* color space, but causes a color correction in which the radius from the center is increased in the a*b* color plane indicating the saturation of the copy image output.

In a conventional approach in which the lightness adjustment is made through the gamma correction by the gamma corrector 112 for reading, once the lightness value of a copy image output is requested to be adjusted to a set value apart from the standard lightness value in the darkening direction, as stated above, achromatic color is created due to per-color value being reduced at the gamma correction by the gamma corrector 112 for reading, and therefore, the resulting image data for recording contains considerably a K color component image data (see the example of the K color component in FIGS. 14(d) and 14(e)).

For the above reasons, the above conventional approach tends to suffer from a drawback that a copy image output formed on the recording paper seems to be unintendedly blacked out due to an unwantedly incorporation of a K color component. On the other hand, the present embodiment does not suffer from such a drawback.

In the present embodiment, as illustrated in FIG. 8(e), the color balance of a copy image output after gamma-corrected in the darkening direction apart from the standard lightness value is represented in terms of ratio of C:M:Y as follows:

C:M:Y=1:3.38:3.77.

As will be evident from the comparison with FIG. 13(e), the present embodiment is more advantageous in that the lightness adjustment does not require to invite a substantial change in color balance, and that a drawback is eliminated that the colors of a darker portion of the copy image output is changed, and, within the changed colors, a black color is emphasized, resulting in the ultimate colors of the darker portion being considerably different from colors created by increasing in density the original colors of the darker portion.

Figure 18:
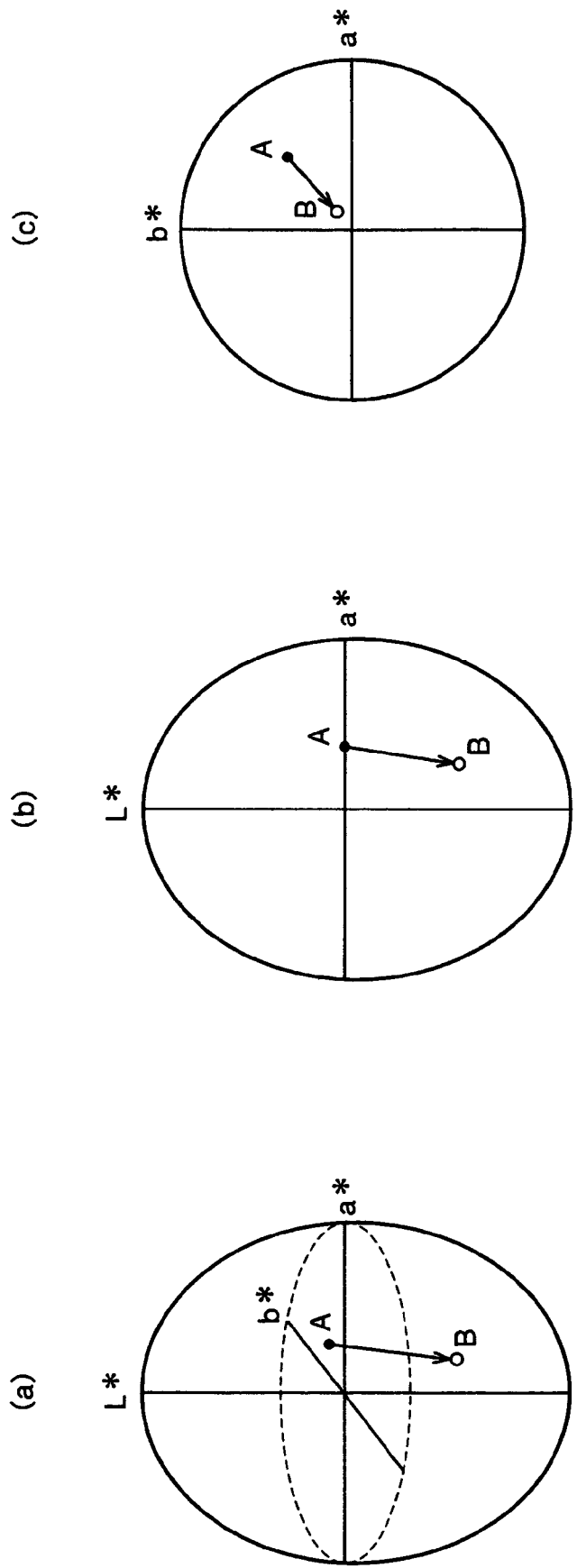

In other words, in the above conventional approach, as illustrated in FIG. 18, once the color represented by position A is adjusted to become darker in the L*a*b* color space, the possibility exists that the current position indicating the color is moved from position A to position B different in lightness and saturation from the original position A. On the other hand, the present embodiment is more advantageous in that the current position indicating the color is moved from position A to position C different in only saturation from the original position A.

Although the present invention has been described by way of example of the present embodiment with the copying function of the multi-function apparatus 1 being focused, the present invention is based on the technique that, the lightness adjustment for darkening (increasing in density) a copy image output is effected by modifying the gamma correction characteristic used for a plurality of per-color sets of image data produced for use in an image recording.

Therefore, the present invention, not limited to the construction for the copying function of the present embodiment, may be alternatively applied to the construction in which, at the stage of converting an input image data of R, G, and B color components, into an output image data of C, M, Y, and K color components, the gamma correction is made for the image data of C, M, Y, and K color components.

As a result, the present invention may be alternatively practiced in an environment in which for example a computer is externally coupled to the multi-function apparatus 1, sets of image data of R, G, and B color components are transmitted from the external computer to the multi-function apparatus 1, and the image recorder 12 forms an image on a recording paper.

Further, the present invention may be also practiced in an environment in which a digital camera is externally coupled to the multi-function apparatus 1, sets of image data of R, G, and B color components produced by the digital camera after capturing a subject are transmitted to the multi-function apparatus 1, and the image recorder 12 forms an image on a recording paper.

In the present embodiment, only the lightness adjustment for a copy image output to be darkened (increased in density) is achieved through the gamma correction performed by the gamma corrector 115 for recording. However, the present embodiment may be modified to a mode in which the lightness adjustment for a copy image output to be brightened is also achieved through the gamma correction performed by the gamma corrector 115 for recording.

Although the present invention has been described above by way of example of the present embodiment in which the sets of image data for recording are defined ones of four color components, namely, C, M, Y, and K color components, the present invention, not limited to that, may be alternatively practiced in an environment in which more-than-four color components are employed for forming an image.

As will be readily understood from the above, in the present embodiment, the image reader 10 constitutes an example of the "input device" set forth in the above mode (1), the image processor 11 (the color converter 113, in particular) constitutes an example of the "image processor" set forth in the same mode, and the image recorder 12 constitutes an example of the "image forming device" set forth in the same mode.

Further, in the present embodiment, the shading corrector 111 corresponds to a portion of the computer 200 to implement the steps S10 and S11, the gamma corrector 112 for reading corresponds to a portion of the computer 200 to implement the step S13, the color converter 113 corresponds to a portion of the computer 200 to implement the step S14, the UCR processor 114 corresponds to a portion of the computer 200 to implement the step S15, and the gamma corrector 115 for recording corresponds to a portion of the computer 200 to implement the steps S17 and S18.

Still further, in the present embodiment, the lightness adjuster 14 and a portion of the computer 200 which is assigned to implement the steps S1-S5 together constitute an example of the "lightness setting device" set forth in the above mode (1), the gamma corrector 112 for reading constitutes an example of the "first corrector" set forth in the same mode, and the gamma corrector 115 for recording constitutes an example of the "second corrector" set forth in the same mode.

Yet further, in the present embodiment, a corresponding portion of the step S6, a corresponding portion of the step S7, and the step S12 together correspond to the "first characteristic modifier" set forth in the above mode (1), and the remaining portion of the step S6, the remaining portion of the step S7, and the step S16 together correspond to the "second characteristic modifier" set forth in the same mode.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for forming an image, comprising:
an input device inputting image data;
a lightness setting device that receives a lightness setting value selected by a user;
a first corrector that corrects the inputted image data according to a first correction characteristic, wherein the first corrector operates in a first color space defined by additive color components;
a first characteristic modifier that modifies the first correction characteristic from a first standard correction characteristic if the lightness setting value received by the lightness setting device is in a first range, and that does not modify the first correction characteristic from the first standard correction characteristic if the lightness setting value received by the lightness setting device is out of the first range, wherein the first corrector corrects the inputted image data according to the first correction characteristic irrespective of whether the first correction characteristic is modified or not;
an image processor that processes the corrected inputted image data, into processed image data;
a second corrector that corrects the processed image data according to a second correction characteristic, wherein the second corrector operates in a second color space defined by subtractive color components;
a second characteristic modifier that modifies the second correction characteristic from a second standard correction characteristic if the lightness setting value received by the lightness setting device is in a second range different from the first range, and that does not modify the second correction characteristic from the second standard correction characteristic if the lightness setting value received by the lightness setting device is out of the second range, wherein the second corrector corrects the processed image data according to the second correction characteristic irrespective of whether the second correction characteristic is modified or not; and
an image forming device that forms the image on a recording medium, based on the processed image data corrected by the second corrector,
wherein the first range and the second range do not substantially overlap.

2. The apparatus according to claim 1, wherein the input device includes a capturing device capturing an image of an original document to produce the image data.

3. The apparatus according to claim 1, wherein the lightness setting device receives the lightness setting value in steps,
   wherein the first characteristic modifier modifies the first correction characteristic to achieve one of a plurality of first correction characteristic curves which corresponds to the lightness setting value received by the lightness setting device, and
   wherein the second characteristic modifier modifies the second correction characteristic to achieve one of a plurality of second correction characteristic curves which corresponds to the lightness setting value received by the lightness setting device.

4. The apparatus according to claim 3, wherein the first characteristic modifier modifies the first correction characteristic, by selecting one of a plurality of first candidate correction-characteristic-curves which represent a plurality of candidates of the first correction characteristic, respectively, wherein the selected one first candidate correction-characteristic-curve corresponds to the lightness setting value received by the lightness setting device, and
   wherein the second characteristic modifier modifies the second correction characteristic, by selecting one of a plurality of second candidate correction-characteristic-curves which represent a plurality of candidates of the second correction characteristic, respectively, wherein the selected one second candidate correction-characteristic-curve corresponds to the lightness setting value received by the lightness setting device.

5. The apparatus according to claim 1, wherein the first characteristic modifier modifies the first correction characteristic, based on a first basic correction-characteristic-curve which represents a basis of the first correction characteristic, and the lightness setting value received by the lightness setting device, and
   wherein the second characteristic modifier modifies the second correction characteristic, based on a second basic correction-characteristic-curve which represents a basis of the second correction characteristic, and the lightness setting value received by the lightness setting device.

6. The apparatus according to claim 5, wherein the first characteristic modifier modifies the first correction characteristic, based on a first factor variable depending on the lightness setting value received by the lightness setting device, and a first function defining the first basic correction-characteristic-curve.

7. The apparatus according to claim 6, wherein the first factor is lower than one and is used for dividing a pre-selected first variable.

8. The apparatus according to claim 7, wherein the first function is defined as a function of a first input value represented by the inputted image data,
   wherein the first variable includes the first input value, and
   wherein the first characteristic modifier compensates the first input value by dividing the first input value by the first factor, and delivers the compensated first input value to the first corrector, to thereby modify the first correction characteristic.

9. The apparatus according to claim 5, wherein the second characteristic modifier modifies the second correction characteristic, based on a second factor variable depending on the lightness setting value received by the lightness setting device, and a second function defining the second basic correction-characteristic-curve.

10. The apparatus according to claim 9, wherein the second factor is lower than one and is used for dividing a pre-selected second variable.

11. The apparatus according to claim 10, wherein the second function is defined as a function of a second input value represented by the processed image data,
    wherein the second variable includes the second input value, and
    wherein the second characteristic modifier compensates the second input value by dividing the second input value by the second factor, and delivers the compensated second input value to the second corrector, to thereby modify the second correction characteristic.

12. The apparatus according to claim 5, wherein the first basic correction-characteristic-curve is defined by a first function of a first input value represented by the inputted image data, and
    wherein the first characteristic modifier compresses a range of the first input value, depending on the lightness setting value received by the lightness setting device, to thereby modify the first correction characteristic.

13. The apparatus according to claim 12, wherein the first characteristic modifier compresses the range of the first input value using a first factor variable depending on the lightness setting value received by the lightness setting device.

14. The apparatus according to claim 13, wherein the first factor is lower than one and is used for dividing the range of the first input value.

15. The apparatus according to claim 5, wherein the second basic correction-characteristic-curve is defined by a second function of a second input value represented by the processed image data, and
    wherein the second characteristic modifier compresses a range of the second input value, depending on the lightness setting value received by the lightness setting device, to thereby modify the second correction characteristic.

16. The apparatus according to claim 15, wherein the second characteristic modifier compresses the range of the second input value using a second factor variable depending on the lightness setting value received by the lightness setting device.

17. The apparatus according to claim 16, wherein the second factor is lower than one and is used for dividing the range of the second input value.

18. The apparatus according to claim 5, wherein the first basic correction-characteristic-curve defines a relationship between the first input value and the first output value such that a rate of change of the first output value with respect to the first input value is higher with the first input value being lower, while the rate of change is lower with the first input value being higher.

19. The apparatus according to claim 5, wherein the second basic correction-characteristic-curve defines a relationship between the second input value and the second output value such that a rate of change of the second output value with respect to the second input value is higher with the second input value being lower, while the rate of change is lower with the second input value being higher.

20. The apparatus according to claim 1, wherein the image processor comprises a converter that converts the image data, inputted by the input device, indicative of R (red), G (green), and B (blue) color components, into recording data, for use in the image processor, indicative of C (cyan), M (magenta), Y (yellow), and K (black) color components, wherein the first corrector uses for the image data first individual correction-characteristic-curves on a color component basis, and wherein the second corrector uses for the recording data second individual correction-characteristic-curves on a color component basis.

21. The apparatus according to claim 20, wherein the image data represents the image on a color component basis in terms of an additive-color-based three-primary-color system, and wherein the recording data represents the image on a color component basis in terms of a subtractive-color-based three-primary-color system.

22. The apparatus according to claim 1, wherein the additive color components include R (red), G (green), and B (blue) color components, and the subtractive color components include C (cyan), M (magenta), and Y (yellow) color components.

23. The apparatus according to claim 22, wherein the subtractive color components further include a K (black) color component.

24. The apparatus according to claim 1, wherein the second range is a darker range than the first range.

25. The apparatus according to claim 1, wherein the first range and the second range do not overlap each other.

26. A method of forming an image, comprising the steps of:
inputting image data;
setting a lightness setting value of an image to be formed on a recording medium;
correcting the inputted image data according to a first correction characteristic, in a first color space defined by additive color components;
modifying the first correction characteristic from a first standard correction characteristic if the lightness setting value is in a first range, and that does not modify the first correction characteristic from the first standard correction characteristic if the lightness setting value is out of the first range, wherein the inputted image data is corrected according to the first correction characteristic irrespective of whether the first correction characteristic is modified or not;
processing the corrected inputted image data, into processed image data;
correcting the processed image data according to a second correction characteristic, in a second color space defined by subtractive color components;
modifying the second correction characteristic from a second standard correction characteristic if the lightness setting value is in a second range different from the first range, and that does not modify the second correction characteristic from the second standard correction characteristic if the lightness setting value is out of the second range, wherein the processed image data is corrected according to the second correction characteristic irrespective of whether the second correction characteristic is modified or not; and
forming the image on the recording medium, based on the corrected processed image data,
wherein the first range and the second range do not substantially overlap.

27. A computer-readable non-transitory medium encoded with a computer program for executing the method according to claim 26.

28. The method according to claim 26, wherein the step of processing comprises a step of converting a first set of density levels of the inputted image data into a second set of density levels of the inputted image data.

29. The method according to claim 26, wherein the lightness setting value is in the first range when the lightness setting value is larger than a reference value, and the lightness setting value is in the second range when the lightness setting value is smaller than the reference value.

30. The method according to claim 26, wherein the additive color components include R (red), G (green), and B (blue) color components, and the subtractive color components include C (cyan), M (magenta), and Y (yellow) color components.

31. The method according to claim 30, wherein the subtractive color components further include a K (black) color component.

32. The method according to claim 26, wherein the second range is a darker range than the first range.

33. An apparatus for forming an image, comprising:
an input device inputting image data;
a lightness setting device that receives a lightness setting value selected by a user;
a first corrector that corrects the inputted image data according to a first correction characteristic, wherein the first corrector operates in a first color space defined by additive color components;
a first characteristic modifier that modifies the first correction characteristic from a first standard correction characteristic if the lightness setting value received by the lightness setting device is in a first range, and that does not modify the first correction characteristic from the first standard correction characteristic if the lightness setting value received by the lightness setting device is out of the first range, wherein the first corrector corrects the inputted image data according to the first correction characteristic irrespective of whether the first correction characteristic is modified or not;
an image processor that processes the corrected inputted image data, into processed image data;
a second corrector that corrects the processed image data according to a second correction characteristic, wherein the second corrector operates in a second color space defined by subtractive color components;
a second characteristic modifier that modifies the second correction characteristic from a second standard correction characteristic if the lightness setting value received by the lightness setting device is in a second range different from the first range, and that does not modify the second correction characteristic from the second standard correction characteristic if the lightness setting value received by the lightness setting device is out of the second range, wherein the second corrector corrects the processed image data according to the second correction characteristic irrespective of whether the second correction characteristic is modified or not; and
an image forming device that forms the image on a recording medium, based on the processed image data corrected by the second corrector,
wherein the lightness setting value is in the first range when the lightness setting value is larger than a reference value, and the lightness setting value is in the second range when the lightness setting value is smaller than the reference value.

* * * * *